(12) United States Patent
Rodriguez et al.

(10) Patent No.: US 9,626,971 B2
(45) Date of Patent: Apr. 18, 2017

(54) SPEAKER RECOGNITION

(71) Applicant: AGNITIO, S.L., Madrid (ES)

(72) Inventors: Luis Buera Rodriguez, Madrid (ES); Carlos Vaquero Aviles-Casco, Madrid (ES); Marta Garcia Gomar, Madrid (ES); Antonio Miguel Artiaga, Zaragoza (ES)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 80 days.

(21) Appl. No.: 14/119,156

(22) PCT Filed: Sep. 20, 2013

(86) PCT No.: PCT/EP2013/069626
§ 371 (c)(1),
(2) Date: Nov. 20, 2013

(87) PCT Pub. No.: WO2014/048855
PCT Pub. Date: Apr. 3, 2014

(65) Prior Publication Data
US 2016/0225374 A1    Aug. 4, 2016

(51) Int. Cl.
G10L 15/00    (2013.01)
G10L 15/14    (2006.01)
G10L 17/16    (2013.01)
G10L 17/04    (2013.01)
G10L 17/10    (2013.01)
G10L 17/24    (2013.01)
(Continued)

(52) U.S. Cl.
CPC .............. G10L 17/16 (2013.01); G10L 17/04 (2013.01); G10L 17/10 (2013.01); G10L 17/14 (2013.01); G10L 17/24 (2013.01); *G10L 2015/025* (2013.01)

(58) Field of Classification Search
None
See application file for complete search history.

(56) References Cited

U.S. PATENT DOCUMENTS 4,817,156 A * 3/1989 Bahl .................. G10L 15/14
704/244
4,829,577 A * 5/1989 Kuroda ............... G10L 15/144
704/244
(Continued)

FOREIGN PATENT DOCUMENTS

WO    WO-2007131530 A1    11/2007

OTHER PUBLICATIONS

L. Buera, A. Miguel, Ó Saz, A. Ortega and E. Lleida, "Unsupervised Data-Driven Feature Vector Normalization With Acoustic Model Adaptation for Robust Speech Recognition," in IEEE Transactions on Audio, Speech, and Language Processing, vol. 18, No. 2, pp. 296-309, Feb. 2010.*

(Continued)

*Primary Examiner* — Edgar Guerra-Erazo
(74) *Attorney, Agent, or Firm* — Jackson Walker L.L.P.

(57) ABSTRACT

Method for text-dependent Speaker Recognition using a speaker adapted Universal Background Model, wherein the speaker adapted Universal Background Model is a speaker adapted Hidden Markov Model comprising channel correction.

47 Claims, 4 Drawing Sheets

(51) Int. Cl.
*G10L 17/14* (2013.01)
*G10L 15/02* (2006.01)

(56) References Cited

U.S. PATENT DOCUMENTS

| | | | | |
|---|---|---|---|---|
| 4,972,485 | A * | 11/1990 | Dautrich | G10L 15/07 704/242 |
| 5,072,452 | A * | 12/1991 | Brown | G10L 15/14 704/256.4 |
| 5,835,890 | A * | 11/1998 | Matsui | G10L 15/065 704/255 |
| 5,995,927 | A * | 11/1999 | Li | G10L 15/065 704/233 |
| 6,055,498 | A * | 4/2000 | Neumeyer | G09B 19/04 434/185 |
| 6,094,632 | A | 7/2000 | Hattori | |
| 6,141,644 | A * | 10/2000 | Kuhn | G10L 17/02 704/238 |
| 6,411,930 | B1 * | 6/2002 | Burges | G10L 17/06 704/236 |
| 6,463,413 | B1 * | 10/2002 | Applebaum | G10L 15/06 704/243 |
| 6,697,778 | B1 * | 2/2004 | Kuhn | G10L 17/02 704/243 |
| 6,760,701 | B2 * | 7/2004 | Sharma | G10L 15/04 704/234 |
| 6,882,972 | B2 * | 4/2005 | Kompe | G10L 15/065 704/251 |
| 6,915,260 | B2 * | 7/2005 | Botterweck | G10L 15/065 704/250 |
| 6,922,668 | B1 * | 7/2005 | Downey | G10L 17/02 704/246 |
| 7,003,460 | B1 * | 2/2006 | Bub | G10L 15/065 704/240 |
| 7,209,881 | B2 * | 4/2007 | Yoshizawa | G10L 15/20 704/233 |
| 7,318,032 | B1 * | 1/2008 | Chaudhari | G10L 17/08 704/231 |
| 7,324,941 | B2 * | 1/2008 | Choi | G10L 15/07 704/255 |
| 7,328,154 | B2 * | 2/2008 | Mutel | G10L 15/063 704/234 |
| 7,447,633 | B2 * | 11/2008 | Navratil | G10L 15/144 704/246 |
| 7,457,745 | B2 * | 11/2008 | Kadambe | G10L 15/07 704/216 |
| 7,813,927 | B2 * | 10/2010 | Navratil | G10L 15/144 704/246 |
| 8,099,288 | B2 * | 1/2012 | Zhang | G10L 17/14 704/250 |
| 2002/0095287 | A1 * | 7/2002 | Botterweck | G10L 15/065 704/250 |
| 2002/0143539 | A1 * | 10/2002 | Botterweck | G10L 15/07 704/255 |
| 2004/0230420 | A1 * | 11/2004 | Kadambe | G10L 15/07 704/205 |
| 2005/0038655 | A1 * | 2/2005 | Mutel | G10L 15/063 704/256 |
| 2006/0111905 | A1 | 5/2006 | Navratil et al. | |
| 2007/0198257 | A1 | 8/2007 | Zhang et al. | |
| 2007/0294083 | A1 | 12/2007 | Bellegarda et al. | |
| 2008/0195389 | A1 * | 8/2008 | Zhang | G10L 17/24 704/246 |
| 2008/0235020 | A1 * | 9/2008 | Navratil | G10L 15/144 704/256.1 |
| 2008/0312926 | A1 | 12/2008 | Vair et al. | |
| 2010/0131273 | A1 | 5/2010 | Aley-Raz et al. | |

OTHER PUBLICATIONS

L. Buera, A. Miguel, E. Lleida, O. Saz and A. Ortega, "Robust speech recognition with on-line unsupervised acoustic feature compensation," Automatic Speech Recognition & Understanding, 2007. ASRU. IEEE Workshop on, Kyoto, 2007, pp. 105-110.*
Rodriguez-Fuentes, L. J., Penagarikano, M., Varona, A., Diez, M., & Bordel, G. (May 2012). KALAKA-2: A TV Broadcast Speech Database for the Recognition of Iberian Languages in Clean and Noisy Environments. In LREC (pp. 99-105).*
Matejka, P., Burget, L., Glembek, O., Schwarz, P., Hubeika, V., Fapso, M., . . . & Cernocky, J. (Sep. 2008). BUT language recognition system for NIST 2007 evaluations. In Interspeech (pp. 739-742).*
Huang, H. J., & Hsu, C. N. (2002). Bayesian classification for data from the same unknown class. IEEE Transactions on Systems, Man, and Cybernetics, Part B (Cybernetics), 32(2), 137-145.*
Campbell, J. P. (1997). Speaker recognition: a tutorial. Proceedings of the IEEE, 85(9), 1437-1462.*
Partial European Search Report for Application No. 12006775.6 dated Mar. 4, 2013.
European Search Report for Application No. 12006775.6 dated May 27, 2013.
Matsui T et al. "Speaker adaptation of tied-mixture-based phoneme models for text-prompted speaker recognition" Published in: Acoustics, Speech and Signal Processing, 1994 IEEE International Conference on (vol. I) dated Apr. 19-22, 1994. pp. I/125-I/128 vol. 1.
R. Vogt et al. "Experiments in Session Variability Modelling for Speaker Verification" Published in: Acoustics, Speech and Signal Processing, 2006. 2006 IEEE International Conference on (vol. 1) dated May 14-19, 2006.
S. Davis et al. "Comparison of Parametric Representations for Monosyllabic Word Recognition in Continuously Spoken Sentences" Published in: IEEE Trans. on Acoustic, Speech and Signal Processing, 28(4): 357-366, Aug. 1980.
Patrick Kenny "Joint Factor Analysis of Speaker and Session Variability: Theory and Algorithms" dated Jan. 13, 2006.
J. Gauvain et al. "Maximum Posteriori Estimation for Multivariate Gaussian Mixture Observations of Markov Chains" Published in: IEEE Transactions on Speech and Audio Processing. vol. 2, No. 2, Apr. 1994: pp. 291-298.
C. J. Leggetter et al. "Maximum likelihood linear regression for speaker adaptation of continuous density hidden Markov models" Published in: Computer Speech and Language (1995): vol. 9: pp. 171-185.
N. Dehak et al. "Support Vector Machines versus Fast Scoring in the Low-Dimensional Total Variability Space for Speaker Verification" Published in: Interspeech, Brighton London, dated Sep. 6-10 2009, pp. 1559-1562.
L. R. Rabiner "A tutorial of Hidden Markov Models and Selected Applications in Speech Recognition" Published in: Proceedings of the IEEE, vol. 77, No. 2, pp. 257-286, Feb. 1989.
A.P. Dempster et al. "Maximum Likelihood from Incomplete Data via the EM Algorithm" Journal of the Royal Statistical Society. Series B (Methodological), vol. 39, No. 1. (1977), pp. 1-38.
C.M Bishop "Pattern Recognition and Machine Learning" Springer Verlag, 2006. Table of Contents, Chapters 9 and 10.
International Search Report for PCT/EP2013/069626 dated Jan. 20, 2014.
Written Opinion for PCT/EP2013/069626 dated Jan. 20, 2014.
Communication pursuant to Article 94(3) EPC, Patent Application No. 13 765 743.3, mailed Sep. 30, 2016, 4 pages.

* cited by examiner

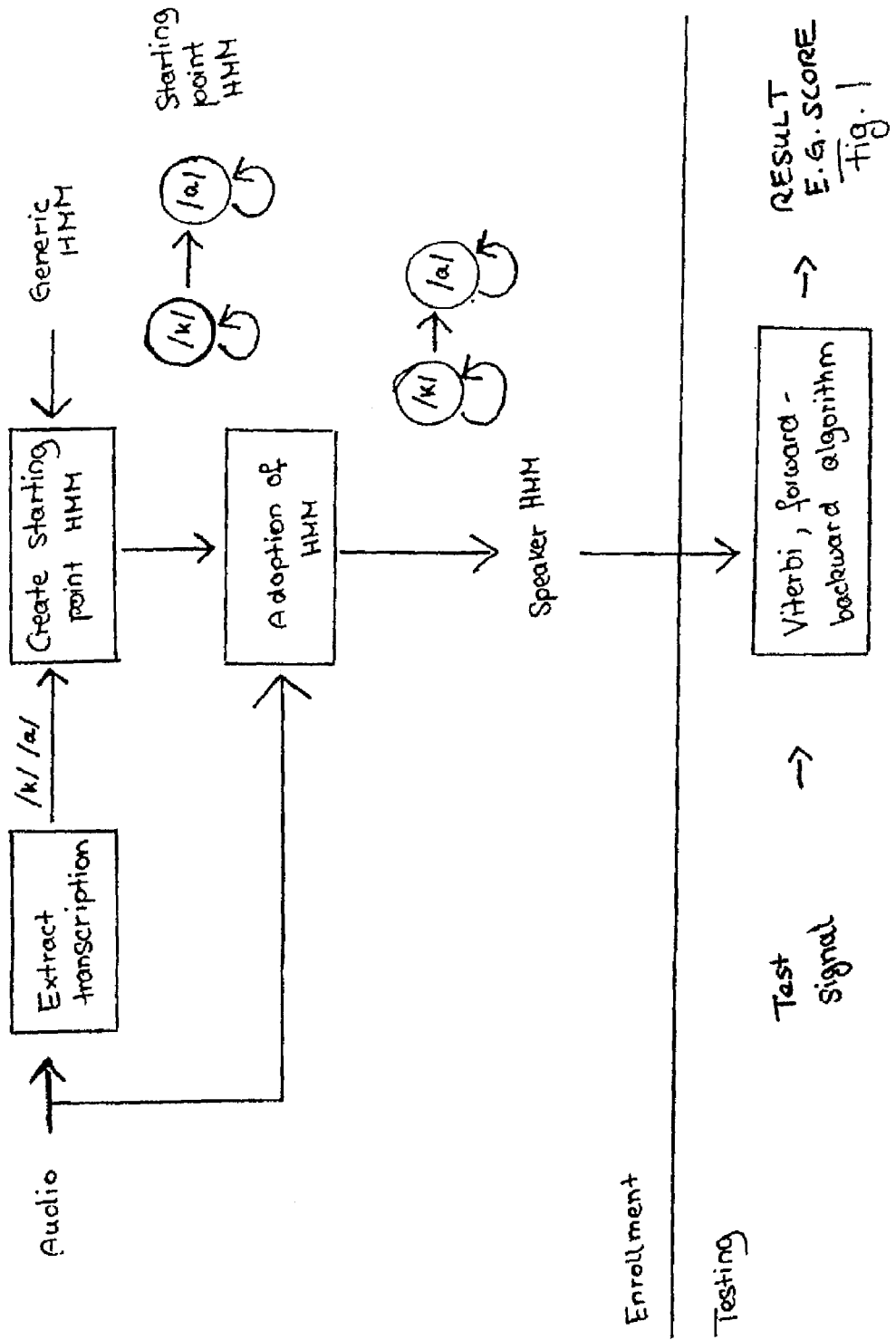

SPEAKER RECOGNITION

CROSS-REFERENCE TO RELATED APPLICATION

The present application is the United States national phase of International Patent Application No. PCT/EP2013/069626, filed Sep. 20, 2013, which application claims priority of European Application No. 12006775.6, filed Sep. 28, 2013. The entire text of the priority application is incorporated herein by reference.

BACKGROUND

Speaker recognition systems can be used to confirm or refuse that a person who is speaking is who he or she has indicated to be (speaker verification) and can also be used to determine who of a plurality of known persons is speaking (speaker identification). Such a speaker identification system can be open-set if it is possible that the speaker who is speaking is not one of the persons known to the system or close-set if the speaker is always in the set of the system. Such systems may find application in telephone banking, suspect identification and may generally be used in a security related context.

Such speaker recognition systems may require the user to say the same lexical content (e.g. the same key phrase) for both the enrolment and the recognition. Such a system is a text-dependent system, offering in some cases additional security because it requires recognizing the identity of the speaker as well as the lexical content of the utterance.

Such recognition systems may also be text-independent, thus not setting any constraint with regard to the lexical content of the enrolment and of the recognition utterances. Such systems may have the advantage that people may be identified for example from common conversations, e.g. everyday conversations or enrolled with such common conversations of which files already exist.

Document US 2008/0312926 A1 discloses an automatic text-dependent, language-independent speaker voice-print creation and speaker recognition based on Hidden Markov Models (HMM) and Automatic Speech Recognition (ASR) systems. Document US 2007/0294083 A1 discloses a fast, text-dependent language-independent method for user authentication by voice based on Dynamic Time Warping (DTW). Document U.S. Pat. No. 6,094,632 discloses a speaker recognition device where the ASR system and Speaker Identification (SID) system outputs are combined.

Patrick Kenny provides an introduction to speaker verification related methods, in particular an algorithm, which may be used in speaker recognition systems in his article "Joint Factor Analysis of Speaker Session Variability: Theory and Algorithms".

Another prior art document is the document "Support Vector Machines versus Fast Scoring in the Low-Dimensional Total Variability Space for Speaker Verification" by N. Dehak et al. in Interspeech, Brighton, London, September 2009.

It is known to use Hidden Markov Models (HMM) consisting of a set of states which correspond to a deterministically observable event and are connected by transition probability arcs. States are defined on a vector of parameters and are extracted from the voice signal. Each state has an associated probability density function (pdf), which models the feature vectors associated to that state. Such a probability density function may for example be a mixture of Gaussian functions (Gaussian Mixtures Models, GMM), in the multi-dimensional space of the feature vectors, but other distributions may also be used.

The Hidden Markov Model is defined by the transition probabilities $\Pi_{qq'}$, associated with the arcs representing the probability of moving from state q to state q', the initial state distributions $\Pi_{0q}$, which are associated to the state q and are the initial probabilities of each state and the observation probability distribution $\lambda_q$ which is associated with the state q and may for example be a GMM. Those observation probability distributions are defined by a set of parameters depending on the nature of the distributions.

Conventional approximations for using Hidden Markov Models in text-dependent speaker recognition frameworks usually requires a transcription of the used phrase which is needed to build the speaker HMM by applying some kind of HMM adaption, for example, a Maximum A Posteriori (MAP) (as disclosed in e.g. J. Gauvin and C. Lee "Maximum Posteriori Estimation for Multivariate Gaussian Mixture Observations of Markov Chains" IEEE Transactions on Speech and Audio Processing, 2(2): 291-298) or Maximum Likelihood Linear Regression (MLLR) (as disclosed e.g. in C. J Leggeter and P. C. Woodland in "Maximum likelihood linear regression for speaker adaptation of the parameters of continuous density Hidden Markov Models") or other adaptations from a starting point model like a concatenation of generic HMMs representing units (e.g. phonems or words) of audio signals e.g. the phrase. In this framework, the generic HMMs are usually called Universal Background Model (UBM). From this, a scoring can be computed using a suitable algorithm like for example Viterbi or forward-backward algorithm as disclosed e.g. in L. R. Rabiner "a tutorial of Hidden Markof Models and selected applications in speech recognition", Proc. Of IEEE77 (2): 257-286, DOI:10.1109/5. 18626. [1].

Such generic HMMs usually require supervised training because every unit (e.g. phoneme, word, . . . ) needs to be associated with a certain HMM. From this the speaker recognition framework can be classified depending on how the transcription is obtained. Possibilities on how such a transcription can be obtained comprises prior knowledge, using conventional speech recognition systems or using universal speech recognition systems as described for example in US 2008/0312926. However, these approaches generally require supervised training and/or are computationally intensive, require a large amount of memory, are usually language dependent and/or are not very flexible. The classical approaches for text-dependent HMM based speaker recognition systems may additionally have the disadvantage that the speaker HMM model has a direct relation with the transcription which may be stolen in at least one point of the system.

In classical speaker recognition using HMM adaption techniques, all the information of the feature vectors is incorporated into the speaker model, even though some information, like for example the channel, is not a typical feature of the speaker and should thus not be included in the speaker model.

For these reasons, classical text-dependent speaker recognition approaches have considerable limitations.

Some of their problems are the above described; storage of the transcription or an estimation of the transcription of the speaker phrase, the use of a speaker recognition or phonetic decoder making the system use a lot of memory and unsuitable for small devices like tablets or smart phones, and the fact that they do not compensate the channel or other negative effects of the speech signal.

Preferably, an improved system may take advantage of the information of the temporal sequence of the feature vectors, which may be extracted from the audio signals, and provide satisfactory performance and accuracy without using a transcription of the utterance, e.g. the speech phrase.

SUMMARY OF THE DISCLOSURE

The present invention relates to automatic speaker recognition and solves at least one or more of the above mentioned problems. In particular, the invention relates to an automatic text-dependent, language-independent speaker recognition taking advantage of the temporal correlation of the speaker information of the feature vectors of the voice sample, but without incorporating the transcription or estimation thereof to any point of the system. Thus, satisfactory results may be achieved with low memory and computational time resources, so that it may be incorporated even in small devices, e.g. smart phones.

The invention comprises a combination of classical text-independent approaches with a text-dependent approach in order to exploit the dynamic information. Effectively, classical text-independent approaches such as Joint Factor Analysis (JFA) as disclosed for example in the above mentioned article "Joint Factor Analysis of Speaker Session Variability: Theory and Algorithms" by Patrick Kenny or i-vector paradigms as explained for example in the document "Support Vector Machines versus Fast Scoring in the Low-Dimensional Total Variability Space for Speaker Verification" by N. Dehak et al. in Interspeech, Brighton, London, September 2009 do not use temporal correlation of voice samples, but very efficiently compensate channel effects to extract only speaker information. On the other hand, classical text-dependent approaches take advantage of temporal correlation thus taking into account a key point in text-dependent problems, but not compensating for channel effects satisfactorily. A combination of these paradigms can be carried at a system level, for example, by fusing a text-dependent speaker recognition system and a text-independent speaker recognition system or by incorporating the text-independent strengths to a text-dependent framework.

The invention comprises a method according to independent claims 1 and 26. Favorable embodiments are disclosed in the dependent claims.

The invention comprises text-dependent speaker recognition with channel correction and text dependent speaker recognition with or without channel compensation combined with text independent speaker recognition.

Text-dependent speaker recognition with channel correction may comprise one or more of the following: training of a Universal Background Model (UBM), e.g. a Hidden Markov Model (HMM), thus fixing the topology, as described e.g. on pages 10-12 (eigenchannel, eigenvoice and error matrices are considered part of UBM), enrolment of a speaker by adapting the UBM to a speaker as described e.g. on pages 7-10 and Annex I, verification, wherein the audio of a given speaker may be compared against the UBM and the speaker model for a certain speaker, e.g. as disclosed on pages 13-16 and Annex I, an optional training of the UBM for a certain lexical content as e.g. disclosed on page 12. In such an approach, JFA framework may be used exemplarily.

Alternatively or additionally, the text-dependent speaker recognition with channel correction may comprise one or more of the following: training of the UBM, e.g. a HMM, thus fixing the topology, e.g. as disclosed on pages 10-12 and 16-22 and Annex II (eigenchannel and eigenvoice matrices are considered part of the UBM), enrolment, where the model is adapted to a speaker, e.g. as disclosed on pages 16-22 and Annex III; verification, as e.g. disclosed on pages 16-22 and Annex IV, an optional training of the UBM for a certain lexical content as e.g. disclosed on pages 16-22 and Annex III. In such an approach, JFA framework may be used exemplarily.

Alternatively or additionally, the text-dependent speaker recognition without channel correction may comprise one or more of the following: training of the UBM, e.g. a HMM, thus fixing the topology, e.g. as disclosed on pages 10-12, enrolment, where the model is adapted to a speaker, e.g. as disclosed on page 10; verification, as e.g. disclosed on pages 16, and an optional training of the UBM for a certain lexical content as e.g. disclosed on page 12.

In an approach of combining text dependent speaker recognition with or without channel compensation with text independent speaker recognition as discussed further below, e.g. on pages 22-26, one or more of the following may be comprised: training of the UBM fixing the topology, enrolment, verification and an optional training of the UBM for a certain lexical content, as discussed before.

In particular, the invention comprises a method for text-dependent speaker recognition using a speaker model obtained by adaptation of a Universal Background Model wherein the speaker model is a speaker adapted Hidden Markov Model comprising channel correction. Such a method may comprise two parts, namely enrolment, where the model is adapted and the recognition part in which a speaker is verified or identified and an audio test is compared against a set of models or one model for verification.

A generic Universal Background Model (generic UBM) is usually adapted to a speaker after a speaker enrolls. The (generic) Universal Background Model may be a Hidden Markov Model.

The (generic) UBM may be adapted based on one or more utterances (enrolment utterances) of the speaker. From such an utterance (e.g. a phrase, a word, a fragment which is usually present as audio file or information) feature vectors (enrolment feature vectors) may be extracted. The utterances comprise speaker information and channel information, wherein the channel is everything between the speaker and the recording support, e.g. comprising a microphone through which the utterances have been transmitted, and anything else through which the utterances have been transmitted, e.g. cables, loudspeakers, etc.

This adaptation may be done in an unsupervised manner. In particular, no lexical content of the utterances or approximation thereof may be necessary. Thus, no speech recognition or other transcription method may be necessary. In other embodiments, the adaptation may be done in a supervised manner, e.g. with the lexical content of the utterances or a transcription thereof known.

A text-dependent model for the corresponding utterance(s) may then be built by adapting the generic Universal Background Model of the text-dependent system with all the enrolment feature vectors of the corresponding utterance(s) (wherein usually each utterance comprises the same lexical content) and speaker. Thus, the system depends on the text, i.e. is text-dependent because each utterances comprises (has to comprise) the same lexical content, but a transcription or knowledge of the lexical content may not be necessary. In other embodiments however, a transcription of the lexical content knowledge of the lexical content may be used.

The enrolment feature vectors are usually extracted from the utterances provided for the enrolment. Channel correction may be applied such that the speaker model depends only on the speaker but not on the channel (as e.g. shown in the document by Kenny, mentioned above).

For each speaker, several models may be generated. Usually one speaker model is adapted from the UBM for one lexical content, e.g. a phrase, a word or a fragment. Each model may be obtained with one, two or more utterances, e.g. five utterances of the same lexical content.

In particular, once some utterances of one speaker are present as audio file or other audio information, e.g. of a certain phrase, a word, a fragment or something similar, short time feature vectors may be extracted. In such time feature vectors, for example Mel Frequency Cepstral Coefficients (MFCC) as shown e.g. by Davis, S. B. and Mermelstein, P. in "Comparison of Parametric Representations for Monosyllabic Word Recognition in Continuously Spoken Sentences", IEEE Trans. on Acoustic, Speech and Signal Processing, 28(4): 357-366, 1980 may be used.

In the time feature vectors all the relevant information of the speaker, lexical content and other aspects (also undesired, e.g. channel effects) are compressed in a small vector at every time interval. For example, at every 10 milliseconds a 60 dimensional feature vector may be created.

With this information, a Joint Factor Analysis paradigm model as disclosed in the above mentioned article by Kenny may be applied to adapt a generic UBM, which is a HMM, compensating at the same time undesirable aspects of the voice signal like for example the channel. For a given speaker, n, and the channel of utterance m, the complete model is:

$$M_{nm} = \Phi + W y_n + V u_{nm} + H o_n \quad (0.1)$$

wherein $\Phi$ is a supervector obtained by concatenation of all the mean vectors of the generic UBM, $M_{nm}$ is the supervector modeling the speaker n and channel of utterance m, W is the rectangular eigenvoice matrix, $y_n$ is the hidden variable which includes the speaker information (speaker factors), V is the rectangular eigenchannel matrix, $u_{nm}$ is the hidden variable which includes the channel information (channel factors), H (an error matrix) is a diagonal matrix for modeling those aspects of the voice signal which are not included in V and W, and $o_n$ is a hidden residual variable associated with H. Herein, m may represent a channel. The term $Ho_n$ may be modeled as zero (and thus not taken into account) in some embodiments. As can be seen, channel correction is included in the model. Herein, the dependency on speaker n and/or utterance m is explicitly mentioned. The dependency/dependencies may, however, be optional and/or mentioning them may not be necessary and be omitted for clarity reasons, e.g. because it is clear that one considers the model for a given speaker n and/or a certain utterance m. According to the invention, the channel information is usually included in the HMM model. Thus, its negative effects can be compensated reaching better results than other channel compensation techniques, such as those that work in the feature vector domain.

For the adaption zero and first order statistics for the utterances which are used for the enrolment for the speaker adaptation of the UBM (enrolment utterances) are required. Some suitable algorithm like for example a forward-backward algorithm or a Viterbi algorithm may be carried out for the generic UBM and each of the utterances of the corresponding phrase and speaker.

For the enrolment utterances, the speaker usually has to say the same lexical content (e.g. a phrase, a word or a fragment) more than once, in particular more than 2, in particular more than 3 or in particular more than 5 times. For verification (recognition) in such systems (explained below) one utterance may be sufficient.

For each speaker, several models may be created (in particular adapted from a generic UBM) with different lexical contents. For each utterance with a lexical content for recognition of the speaker, usually the model corresponding to said lexical content is used.

For example, using a forward-backward algorithm, the probability of being in the Gaussian c of state q at time t for speaker n and utterance m $\gamma_{nqc}^m(t)$ can be calculated. The Annex I shows how these probabilities can be calculated according to an embodiment of the invention.

From this, the zero and first order statistics over time are:

$$N_{nqc}^m = \sum_t \gamma_{nqc}^m(t) \quad (0.2)$$

$$F_{nqc}^m = \sum_t \gamma_{nqc}^m(t) x_{nmt} \quad (0.3)$$

Herein $x_{nmt}$ is the enrolment feature vector at time interval t for speaker n and utterance m. The superscript m refers to the utterance for which $N_{nqc}^m$ and $F_{nqc}^m$ are computed. Although the speaker n and/or utterance m dependencies are mentioned here explicitly, they may be optional and/or mentioning them may not be necessary and may be omitted for clarity reasons, because it is clear that a model for a given speaker n and/or a certain utterance m is considered.

From this, speaker and channel factors may be extracted and the mean vectors of the adapted HMM may be given as $$\overline{M}_n^m = \Phi + W y_n. \quad (0.4)$$

This equation may represent the means of the speaker adapted model (speaker model) and may also be used in a recognition process later on. The superscript m refers to the lexical content, for which $\overline{M}_n^m$ is adapted. $y_n$ may be calculated from the enrolment utterance(s) as shown e.g. in the document by Kenny, while W (like V and H, if required) may be obtained in a previous developing phase (after the unsupervised training of the generic UBM) as shown e.g. in the document by Kenny.

For practical purposes, the system may not store $\overline{M}_n^m$, but may only store $y_n$. This may be advantageous as the vector $y_n$ may have considerably fewer dimensions than $\overline{M}_n^m$. Because W and $\Phi$ may have to be stored anyway, the storage of $y_n$ instead of $\overline{M}_n^m$ may reduce the necessary system resources.

The transition probabilities may be adapted from the generic UBM in order to complete the speaker model (speaker adapted model), which may have the same parameters as the UBM except the means, which may be computed using the equations provided before and the transition probabilities as provided below. The transmission probabilities of the generic UBM, e.g. a HMM, may be adapted from the known transition probabilities of the generic UBM, e.g. a HMM, e.g. using the enrolment utterances and may be given as $$\hat{\Pi}_{qq'} = \frac{\sum_t \tau_t(q, q')}{\sum_{q'} \sum_t \tau_t(q, q')} \quad (0.5)$$

$$\tau_t(q, q') = \frac{\alpha_q(t) \Pi_{qq'} \lambda_{q'}(x_{nmt+1}) \beta_{q'}(t+1)}{\sum_{q'} \alpha_q(t) \Pi_{qq'} \lambda_{q'}(x_{nmt+1}) \beta_{q'}(t+1)} \quad (0.6)$$

The meaning of the variables in these equations may be as explained e.g. in the Annex I. The subscripts m and n could be included in the variables that depend on t, such as α, β or τ. However, they are omitted it in order to clarify the notation.

In some embodiments of a method according to the invention, only mean vectors and transition probabilities of the generic UBM may be adapted in the speaker model as they have proven to be the most important parameters. In other embodiments, all of the parameters of the generic UBM may be adapted to the speaker. At this point, enrolment may be completed.

In a method according to the invention, the mean vectors and the transition probabilities of the generic UBM may for example be adapted for the speaker model using a MAP (maximum a posteriori) adaptation.

Adapting a generic UBM may be advantageous because relatively little data is required for such an adaptation allowing to reach good results even with little enrolment data.

In a method according to the invention, the generic UBM may be trained in an unsupervised training before it is adapted for a certain speaker and text content. In particular, it may be trained from a set of audio information without the information of the transcriptions using a suitable algorithm like for example Expectation Maximization algorithm (EM) (as disclosed e.g. in A. P. Dempster, N. M. Laird and D. B. Rubin, "Maximum likelihood from incomplete data via the EM algorithm", Journal of the Royal Statistical Society, 39(1)) or Variational Bayes algorithm (VB) (as disclosed e.g. in C. M. Bishop, "Pattern Recognition and Machine Learning", Springer Verlag).

For this unsupervised training, utterances of several speakers may be used, for example, of more than five, in particular of more than ten, in particular of more than twenty speakers which may speak more than one, in particular more than five, in particular more than ten, and in particular more than fifteen different languages and/or utterances of more than 1, in particular more than 2, in particular more than 5, in particular more than 10 and in particular more than 20 Hungarian speakers may be used for the unsupervised training of the generic UBM. (Hungarian is considered to cover almost all of the possible sounds that can be pronounced in most of the main spoken languages.) Of one, more or all speakers whose utterances are used more than one, in particular, more than 5 utterances may be used.

In such a training phase, preferably several, e.g. as many as possible free speech conversations may be used to train the generic UBM to be ready for any utterance, e.g. password, phrase or language that may be used during operation.

Such an unsupervised training may be advantageous because that way each state of the generic UBM does not have a physical meaning (e.g. is not confined to a certain phoneme) thus increasing the security and reducing the cost necessary to create such a generic UBM.

In other embodiments, the generic UBM is not trained in an unsupervised manner, but in a different manner, e.g. supervised training, e.g. using transcriptions of part or all of the utterances or similar.

The topology of the generic UBM may be selected to comprise a transition probability from each possible state to itself and each possible other state thus making sure that each possible utterance, e.g. password, phrase or language can be used in that generic UBM.

In addition, the observation probability distributions may be Gaussian mixture models optionally comprising diagonal covariance matrices and four components.

In a method according to the invention, the number of states may be fixed.

In particular, the number of states may be set to less than thirty states, to thirty or to more than thirty, or the number states may set to the number of Hungarian phonemes, or a number which may be estimated by an analysis of the spectral properties of a speech signal.

This may, e.g. be done when a precise generic UBM for a certain lexical content, e.g. a certain phrase, a certain word or a certain fragment is needed. Such a generic UBM may have to be re-trained for every new lexical content, e.g. phrase, word or fragment.

In particular, it may be assumed that as many states may be needed as spectral changes are detected in a signal. An algorithm to find the number of spectral changes may be based on a short time smooth linear prediction analysis. Given two adjacent segments, f and g, they may be analyzed in order to determine whether there is a spectral change between them or not. A possible divergence measure can be computed by $$\text{Diverg}(f, g) = \log\left(\frac{a_g^H R_{ff} a_g}{a_f^H R_{ff} a_f}\right) \quad (0.7)$$

If the divergence measure is higher than a certain threshold, it may be assumed that the spectral change was present between segments f and g. $R_{ff}$ may be the autocorrelation signal of the segment f, and $a_*$ (wherein * may be f or g) may be the filter coefficients of the optimum linear prediction filter for * for example extracted from the autocorrelation signal by solving the minimum squared prediction error problem. This may be similar to the voice activity detector (VAD) of GSM (ETSI EN 300 730).

The method may further comprise adapting one or more parameters, e.g. a number of states and/or e.g. the generic UBM to a lexical content, e.g. a passphrase or password. Thus, if a certain lexical content is used and already known, it may not be necessary to cover all sounds with the generic UBM. In particular, the rest of the generic UBM parameters may then be found using data and classical HMM adaption algorithms such as e.g. MAP. For this, the data of about 10, e.g. 5-15 speakers speaking the lexical content (e.g. a (pass)phrase, (pass)word or a fragment) a few times, e.g. 2-5 times, may be used and may already be sufficient.

In other embodiments, the generic UBM parameters are found using data and starting from scratch, not adapting a generic HMM.

Following that or alternatively, eigenchannel matrix V and eigenvoice matrix W may be trained in a development session before the generic UBM may be adapted for a speaker. By having these two matrices channel correction may be performed since the channel information (eigenchannel matrix) is kept separate from the speaker information (eigenvoice matrix), which may be processed separately. In this development session in the matrix H, which may model the aspects of the voice signal not included in V and W, may also be trained. In other embodiments, H may be modeled as 0, thus not being present and not needing to be trained.

A method according to the invention may also comprise the step of verifying, whether a test signal was spoken by the target person. Such a verifying may be done in an unsupervised manner No transcription or approximation of the lexical content may therefore be necessary for the verifying step, and in particular, e.g. no speech recognition or transcription method may be necessary.

For this, a testing feature vectors of speaker n and utterance m $\{x_{nm1}, x_{nm2}, x_{nm3}, \ldots, x_{nmT}\}$ may be created from the spoken test signal. Again, speaker n and/or utterance m dependencies are mentioned here explicitly. However, the dependencies may be optional and/or mentioning them may not be necessary and may be omitted for clarity reasons because it is clear that testing feature vector corresponds to a speaker n and/or a certain utterance m.

In particular, for example MFCC may be used wherein in every 10 milliseconds a 60 dimensional feature vector is created.

Furthermore, the speaker model represented by the speaker factors $y_n$ and zero and first order statistics computed with the testing feature vectors may be used for the calculation.

Statistics may be computed using the generic UBM and the speaker model with a suitable algorithm, e.g. forward-backward or Viterbi algorithm. Then the log likelihoods of the speaker model $LL_{spk}$ and the generic UBM model $LL_{UBM}$ may be computed.

In particular, a suitable algorithm, for example, the Viterbi or forward-backward algorithm may be carried out with the testing feature vectors and the speaker adapted HMM, wherein the means and the transition probabilities may be the adapted ones.

Such a suitable algorithm like for example the Viterbi or forward-backward algorithm may then provide a most likely path for the feature vectors (testing feature vectors) over the speaker adapted HMM states in this case $\hat{S}^{spk} = \{\hat{s}_{nm1}^{spk}, \hat{s}_{nm2}^{spk}, \ldots, \hat{s}_{nmT}^{spk}\}$. Herein, the dependency on speaker n and/or utterance m is explicitly mentioned. The dependency/dependencies may, however, be optional and/or mentioning them may not be necessary and be omitted for clarity reasons, e.g. because it is clear that one considers the model for a given speaker n and/or a certain utterance m. Note that the subscripts could be included in $\hat{S}^{spk}$, but are omitted in order to simplify the notation.

Then the probability of being in Gaussian c of state q of the generic UBM at time t for speaker n and utterance m may calculated as $$\gamma_{nqc}^{m,Vit,spk}(t) = \begin{cases} \dfrac{P_{qc}\lambda_{qc}(x_{nmt})}{\sum_c P_{qc}\lambda_{qc}(x_{nmt})} & \text{if } q = \hat{s}_{nmt}^{spk} \\ 0 & \text{otherwise} \end{cases} \quad (0.8)$$

and the zero and first order statistics may be given as $$N_{nqc}^{m,spk} = \sum_t \gamma_{nqc}^{m,Vit,spk}(t) \quad (0.9)$$

$$F_{nqc}^{m,spk} = \sum_t \gamma_{nqc}^{m,Vit,spk}(t) x_{nmt}. \quad (0.10)$$

Herein $x_{nmt}$ is the feature vector of speaker n and utterance m at time interval t and $\lambda_{qc}$ is computed using the mean and covariance matrix of Gaussian c of state q of the generic UBM, $\mu_{qc}$ and $\Psi_{qc}$.

Again, the dependency on speaker n and/or utterance m is explicitly mentioned. The dependency/dependencies may, however, be optional and/or mentioning them may not be necessary and be omitted for clarity reasons, e.g. because it is clear that one considers the model for a given speaker n and/or a certain utterance m. Then a log likelihood of the feature vectors regarding the speaker adapted HMM may be obtained e.g. as disclosed in the document by Kenny ($LL_{SPK}$). Here, the speaker adapted model may be used only to determine the (most likely) path, but not to compute the statistics. The most likely path may then for example be used to extract the log likelihood ratio, e.g. as explained below. In this approach, channel correction may be included.

This may be in contrast to the classic JFA approach using the generic UBM to determine a (most likely) path, producing different misalignment, especially in text-dependent approaches. However, the classic JFA approach may also be taken.

Then a corresponding step may be carried out with a generic UBM and the testing feature vectors, thus leading to a most likely path $\hat{S}^{UBM} = \{\hat{s}_{nm1}^{UBM}, \hat{s}_{nm2}^{UBM}, \ldots, \hat{s}_{nm3}^{UBM}\}$. Herein, the dependency on speaker n and/or utterance m is explicitly mentioned. The dependency/dependencies may, however, be optional and/or mentioning them may not be necessary and be omitted for clarity reasons, e.g. because it is clear that one considers the model for a given speaker n and/or a certain utterance m. Although the subscripts n and m could also be included in $\hat{S}^{UBM}$ they are omitted to simplify the notation. For this again, a suitable algorithm like for example the Viterbi or forward-backward algorithm may be used.

The probability of being in Gaussian c and state q of the generic UBM for speaker n and utterance m can be computed as $$\gamma_{nqc}^{m,Vit,UBM}(t) = \begin{cases} \dfrac{P_{qc}\lambda_{qc}(x_{nmt})}{\sum_c P_{qc}\lambda_{qc}(x_{nmt})} & \text{if } q = \hat{s}_{nmt}^{UBM} \\ 0 & \text{otherwise} \end{cases} \quad (0.11)$$

with corresponding zero in first order statistics:

$$N_{nqc}^{m,UBM} = \sum_t \gamma_{nqc}^{m,Vit,UBM}(t) \quad (0.12)$$

$$F_{nqc}^{m,UBM} = \sum_t \gamma_{nqc}^{m,Vit,UBM}(t) x_{nmt} \quad (0.13)$$

Again $x_{nmt}$ is a feature vector of speaker n and utterance m in the time interval t and $\lambda_{qc}$ is computed using the mean and covariance matrix of Gaussian c of state q of the generic UBM, $\mu_{qc}$ and $\Psi_{qc}$. Then the log likelihood ratio of the feature vectors may be calculated (e.g. as disclosed in the document by Kenny ($LL_{UBM}$)).

As a final measure for the comparison between the testing signal (utterance), for example, an audio file with an utterance, e.g. testing phrase or a password spoken by a speaker with regard to one selected speaker model, the log likelihood ratio ($LLR_{td}$) may be computed as $$LLR_{td} = \quad (0.14)$$

$$LL_{spk} - LL_{UBM} + \sum_{i=1}^{T-1} \log(\Pi_{\hat{s}_{nmi}^{spk}\hat{s}_{nmi+1}^{spk}}^{spk}) - \sum_{i=1}^{T-1} \log(\Pi_{\hat{s}_{nmi}^{UBM}\hat{s}_{nmi+1}^{UBM}}^{UBM})$$

In this case, the log likelihood ratio may in addition to the logs of the likelihood ($LL_{spk}$ and $LL_{UBM}$) also comprise the logarithm of terms describing the speaker adapted transition probabilities and generic transition probabilities over the most likely paths of the corresponding models which have been calculated. This may be advantageous as it may take the temporal progression along the HMMs into account.

A method according to the invention may comprise computing of a likelihood ratio or a log likelihood ratio comparing an enrolled (target) speaker and a testing speaker, based on an utterance from the testing speaker. This may be done as described previously, or similar to the manner described previously, to find out whether the testing speaker corresponds to the target person (and thus to verify whether the test signal was spoken by the target person). In particular, a (log) likelihood ratio may be the (log) ratio of the likelihood of the utterance given the speaker dependent model (speaker model) to the likelihood of the utterance given the UBM (which may e.g. be a UBM comprising a Hidden Markov Model (HMM-UBM)).

A method according to the invention may comprise the step of verifying with or without channel correction/channel compensation, whether a test signal was spoken by the target person. Such a verifying may be done in an unsupervised manner Thus, a likelihood ratio or log likelihood ratio may be provided between the likelihood obtained with testing feature vectors and model of the target speaker (HMM) and the likelihood obtained with testing feature vectors and UBM. Both likelihoods may be computed using a suitable algorithm e.g. Viterbi or forward-backward algorithm.

Such a method may further comprise a step of identifying a target person by identifying the speaker of a speaker model adapted from the generic UBM with the highest likelihood score before verifying whether the target person is indeed the one to have spoken the test signal as explained before.

A method according to the invention may comprise the step of training the Universal Background Model. This may be done in an unsupervised training, for example as described previously or similar to that described previously, or may be done in a supervised training where the lexical content of the utterances, or an approximation thereof, is necessary. In such a supervised training, speech recognition or another transcription method of the lexical content may be used.

A method according to the invention may in particular use one, two, three or more or all of the variables that will be discussed in the following. These variables may be represented in a complete model which also shows all the relations between the variables. The complete model may comprise as variables a sequence of speaker factors $$Y=\{y_1, \ldots y_n, \ldots y_N\}, y_n \epsilon \square^R \qquad (0.15)$$

Here, $y_n$ is the speaker factor of speaker n. n may be between 1 and N; there are N speakers. N may be one, two, three, or more. $y_n$ may be a random vector variable of dimension R, and is usually a continuous hidden random vector variable of dimension R. R and R' (introduced below) may be chosen depending on the application, e.g. heuristically. R and/or R' may e.g. be more than 10, e.g. more than 50, e.g. more than 80, e.g. more than 100, e.g. more than 130. Additionally or alternatively, R and/or R' may be less than 1000, e.g. less than 300, e.g. less than 200, e.g. less than 150. For example, R and/or R' may be between 50 and 150.

The complete model may also comprise a sequence of channel factors $$U=\{u_{11}, \ldots u_{nm}, \ldots u_{NM}\}; u_{nm} \epsilon \square^{R'} \qquad (0.16)$$

Herein, $u_{nm}$ is the channel factor of utterance m of speaker n. It is a random vector variable of dimension R', usually a continuous hidden random vector variable of dimension R'. There are M different utterances per speaker, so m is between 1 and M. M may be 1, 2, 3, or more. In some embodiments, there may be a number $M_n$ utterances for each speaker n, wherein $M_n$ does not have to be the same for each speaker n. In other embodiments there are M (which is a constant) utterances for each speaker. Although in the following we will refer only to a constant M, this is not intended to limit the invention to constant M as the modifications necessary to take into account a non-constant $M_n$ are straight forward to a person skilled in the art and comprised by the invention.

The complete model may also comprise a sequence of the feature vectors.

$$X=\{x_{111}, \ldots x_{nmt}, \ldots x_{NMT}\}, x_{nmt} \epsilon \square^D \qquad (0.17)$$

Herein, $x_{nmt}$ is the feature vector of utterance m of speaker n at time index t. t may be between 1 and T, wherein T may be 1, 2, 3 or more. Thus, there are T feature vectors for each utterance of each speaker. $x_{nmt}$ is a random variable of dimension D, and is usually an observed (observable) random variable of dimension D.

There may be a different number of feature vectors per speaker and utterance $T_{nm}$ and/or the number may be the same for some utterances. In other embodiments there may be the same number T (which is a constant) of feature vectors for all utterances of all speakers. Although in the following we will refer only to a constant T, this is not intended to limit the invention to constant T as the modifications necessary to take into account a non-constant $T_{nm}$ are straight forward to a person skilled in the art and comprised by the invention.

The complete model may also comprise as variable a sequence of Hidden Markov Model states $$S=\{s_{11}, \ldots s_{nmt}, \ldots s_{NMT}\}; s_{nmt} \epsilon \{0,1\}^Q. \qquad (0.18)$$

Q is the number of states and can be fixed heuristically or it may be fixed when the topology of the UBM is accorded. It may for example be determined according the number of spectral changes in the signal as described before.

Herein, $s_{nmt}$ is a discrete random vector variable of dimension Q. Usually, it is a hidden (non-observable) variable. Each of the components $s_{nmtq}$ is binary. Thus, its value can be 0 or 1. If one $s_{nmtq}$ is 1, the rest of the components $s_{nmtq' \neq q}$ is 0, because only one of the states generates $x_{nmt}$.

The complete model may also comprise the sequence of Hidden Markov Model components $$Z=\{z_{111}, \ldots z_{nmt}, \ldots z_{NMT}\}; z_{nmt} \epsilon \{0,1\}^C. \qquad (0.19)$$

Herein, $z_{nmt}$ is the active component generating the feature vector $x_{nmt}$. It is a discrete random vector variable of dimension C, usually a hidden variable. C may e.g. be fixed when the topology of the UBM is fixed. It may for example be determined heuristically. Each of the components $z_{nmtc}$ of $z_{nmt}$ is binary. Thus, its value can be 0 or 1. If the value of one component $s_{nmtc}$ is 1, the rest of the components $s_{nmtc' \neq c}$ are 0 because only one component generates $x_{nmt}$. There are C different components per state.

Herein, one state usually has an associated probability density function (pdf). The pdf may be a GMM comprising a set of Gaussians. Each Gaussian may in this example be called a component.

The number of components $C_q$ may, in some embodiments, not be identical for all Q states. In other embodiments the number of components C may be constant (identical) for all Q states. C may e.g. be 4 or around 4.

Although in the following we will refer only to a constant C, this is not intended to limit the invention to constant C as the modifications necessary to take into account a non-constant $C_q$ are straight forward to a person skilled in the art and comprised by the invention.

The dependencies of the variables may be described by a Bayesian network. In the Bayesian network the feature vectors $x_{nmt}$ of utterance m of speaker n and time index t may be the observed parameters. The speaker factor $y_n$ for each speaker n, the channel factors $u_{nm}$ of the utterance m of speaker n, the active state $s_{nmt}$ generating the feature vector $x_{nmt}$ and the active component $z_{nmt}$ generating the feature vector $x_{nmt}$ may be hidden parameters.

As can be seen, there may be N×M groups comprising the U, S, Z, and X components for each particular m (utterance) and n (speaker) and N groups comprising Y components for each particular speaker n.

In such a Bayesian network, each $x_{nmt}$ may be dependent on $s_{nmt}$, on $z_{nmt}$, on $y_n$ and $u_{nm}$. $z_{nmt}$ may depend on $s_{nmt}$. $s_{nmt}$ may depend on $s_{nmt-1}$. $s_{nm1}$ may not depend on any other $s_{nmt}$.

The complete model may for example be expressed as $$f(X,Y,U,S,Z) = f(Y)f(U)f(S)f(Z|S)f(X|Y,U,S,Z).$$

This may be developed as:

$$f(X, Y, U, S, Z) = \prod_n^N f(y_n) \prod_{n,m}^{N,M} f(u_{nm}) \prod_{n,m}^{N,M} f(s_{nm1}) \prod_{n,m,t>1}^{N,M,T} f(s_{nmt} | s_{nmt-1}) \\ \prod_{n,m,t}^{N,M,T} f(z_{nmt} | s_{nmt}) \prod_{n,m,t}^{N,M,T} f(x_{nmt} | y_n, u_{nm}, s_{nmt}, z_{nmt})$$

(0.20)

Herein, f(*) represents the probability density function (pdf) of the variable * mentioned in brackets. The above mentioned models may be initialized using 1, 2, 3, or more of the following probability density functions.

$$y_n \sim N_R(0, I_R) \quad (0.21)$$

$$u_{nm} \sim N_{R'}(0, I_{R'}) \quad (0.22)$$

$$s_{nm1} \sim Mult_Q(1, \Pi_0); \; f(s_{nm1}) = \prod_{q'}^{Q} (\Pi_{0q'})^{s_{nm1q'}} \quad (0.23)$$

$$s_{nmt} | s_{nmt-1q=1} \sim Mult_Q(1, \Pi_q); \quad (0.24)$$

$$f(s_{nmt} | s_{nmt-1q=1}) = \prod_{q'}^{Q} (\Pi_{qq'})^{s_{nmtq'}}$$

$$z_{nmt} | z_{nmtq=1} \sim Mult_C(1, P_q); \quad (0.25)$$

$$f(z_{nmt} | s_{nmtq=1}) = \prod_c^C (P_{qc})^{z_{nmtc}}$$

$$x_{nmt} | s_{nmtq=1}, z_{nmtc=1}, y_n, u_{nm} \sim N_D(\mu_{qc} + W_{qc}y_n + V_{qc}u_{nm}, \psi_{qc}) \quad (0.26)$$

The speaker factor for speaker n, $y_n$ may be assumed to follow a multivariate normal distribution with zero mean and identity covariance.

The channel factors for speaker n and utterance m may be assumed to follow a multivariate normal distribution with zero mean and identity covariance.

The first state per speaker and utterance, $s_{nm1}$, may be assumed to follow a multinomial distribution where $\Pi_{0q'}$ is the prior probability of the state q' (the q' element of $\Pi_0$, which is a Q dimensional vector, $\mathbb{R}^Q$). $s_{nm1q'}$ is the q' element of $s_{nm1}$.

The state $s_{nmt}$, given the previous one $s_{nmt-1q=1}$, which is q, may be assumed to follow a multinomial pdf, where $\Pi_{qq'}$ is the transition probability from state q to q' (the q' element of $\Pi_q$, which is a Q dimensional vector, $\mathbb{R}^Q$). $s_{nmtq'}$ is the q' element of $s_{nmt}$.

The component $z_{nmt}$, given the state $s_{nmtq=1}$, which is q, may be assumed to follow a multinomial pdf, where $P_{qc}$ is the prior probability of the component c (the c element of $P_q$ which is a C dimensional vector, $\mathbb{R}^C$). $z_{nmtc}$ is the c element of $z_{nmt}$.

The feature vector $x_{nmt}$, given the state $s_{nmtq=1}$, which is q, the component $z_{nmtc=1}$, which is c, the speaker factor $y_n$, and the channel factor $u_{nm}$ may be assumed to follow a multivariate normal distribution with mean $\mu_{qc}+W_{qc}y_n+V_{qc}u_{nm}$ and covariance $\Psi_{qc}$. Each state may have as associated distribution a mixture of C Gaussians where $\mu_{qc}$ is the mean vector (dimension D), $W_{qc}$ is the eigenvoice matrix (D×R), $V_{qc}$ is the eigenchannel matrix (D×R') and $\Psi_{qc}$ is the diagonal covariance matrix (D×D), of the state q and component c (0.26).

D is usually a number between 10 and 100, e.g. between 50 and 70, e.g. 60.

Thus, the complete model can be expressed as:

$$f(X, Y, U, S, Z) = \prod_n^N f(y_n) \prod_{n,m}^{N,M} f(u_{nm}) \\ \prod_{n,m}^{N,M} \prod_q^Q (\Pi_{0q})^{s_{nm1q}} \prod_{n,m,t>1}^{N,M} \prod_{q,q'}^{Q,Q} (\Pi_{qq'})^{s_{nmt-1q}s_{nmtq'}} \\ \prod_{n,m,t}^{N,M,T} \prod_{q,c}^{Q,C} (P_{qc})^{s_{nmtq}z_{nmtc}} \\ \prod_{n,m,t}^{N,M,T} \prod_{q,c}^{Q,C} (f(x_{nmt} | y_n, u_{nm}, s_{nmtq=1}, z_{nmtc=1}))^{s_{nmtq}z_{nmtc}}$$

(0.27)

In embodiments of a method for text dependent speaker identification using the above mentioned model, in the model develop step (in which the UBM (HMM-UBM) is trained before it is usually adapted to one, two or more speakers) the parameters that define the HMM-UBM: $\mu_{qc}$, $W_{qc}$, $V_{qc}$, $\Pi_0$, $\Pi_q$, $P_q$ and $\Psi_{qc}$ may be estimated. In other embodiments, the model may be trained in a different manner, e.g. as described above.

For this purpose, an iterative algorithm like e.g. an iterative EM algorithm may be applied given the develop data X (0.17). It may be applied with 1, 2, 3, 4 or 5 more iterations to train the model.

In some embodiments of the invention, in the iterative algorithm, in some of the iterations an additional step is introduced for maintaining boundary conditions or a step is replaced by a step for maintaining boundary conditions, for example, to guarantee a certain mean value and/or a certain constant variance or co-variance. For example, in an expectation maximization algorithm, after a few iterations, the maximization step may be replaced by a step of divergence re-estimation. An example therefore can be found e.g. in Annex II.

An example of the steps of an interactive Expectation Maximization algorithm can be found in Annex II forming part of the description.

In methods according to the invention using a model as previously described, a speaker dependent model (speaker model) may be created from the (generic) UBM and the enrollment data from one, two, three or more speakers. In particular, the UBM may be adapted to the speaker(s) using the enrollment data from the one, two, three or more speakers.

This may comprise adapting the mean vectors and the eigenvoice matrix of the generic UBM according to the enrollment data of the one, two, three or more speakers. Further details how such a speaker dependent model may be created can be found in Annex III forming part of the description.

The invention further comprises a method for text-dependent speaker identification comprising a method for text-dependent speaker recognition described above. According to an embodiment of the invention, a likelihood ratio (or log likelihood ratio) which may be used for speaker identification and/or speaker verification may be determined as explained in Annex IV forming part of the description.

The invention may also comprise a method for text-dependent speaker recognition using a combination of a text-dependent and a text-independent system, wherein the text-dependent system is adapted and wherein in addition a model of the text-independent system is also built for the speaker and the phrase.

The adaptation may optionally be done in an unsupervised manner (unsupervised way). In particular, no lexical content of the utterances or approximation thereof may be necessary. Thus, no speech recognition or other transcription method may be necessary.

The text-dependent model may use a generic UBM, e.g. a HMM as starting point, In particular, it may be a UBM which was trained in an unsupervised way and may have a topology as explained above. Thus, no transcription of the lexical content may be needed for the training and no transcription of the lexical content may be needed for the following adapting to a speaker. The generic UBM may for example be a HMM and may be adapted to the speaker for example by a suitable algorithm like MAP or a Bayesian algorithm (as disclosed e.g. in C. M Bishop "Pattern Recognition and Machine Learning", Springer Verlag).

When a text-dependent and text-independent speaker recognition systems are combined, the text-independent one may be composed by classic JFA or i-vector framework, and it may give a score or a log likelihood ratio with channel compensation. On the other hand, the text-dependent system may not do any kind of channel compensation, or may optionally use channel correction, e.g. as described above, and it may give a score or a log likelihood ratio.

The procedure may be as following:

For the procedure, e.g. feature vectors as mentioned above may be used, e.g. with the parameters of 10 ms time intervals and 60 dimensional MFFC.

For the text-dependent system, the generic UBM, which may be a HMM, may be adapted to the speaker with some enrolment audio(s) by MAP, using a suitable algorithm, like for example, using Viterbi or forward backward algorithm. Then, the enrolment may be finished. For recognition, a suitable algorithm, like e.g. Viterbi may be applied with the testing audio and the speaker model, getting $LLR_{spk}$. Also, the suitable algorithm, like e.g. Viterbi may be applied with the testing audio and the generic UBM, getting $LLR_{UBM}$. No channel compensation may be necessary and thus channel compensation may not be done. In other embodiments, the text-dependent system may correspond to a text dependent system as described above. Finally, the $LLR_{td}$ may be computed as $$LLR_{td}=LLR_{spk}-LLR_{UBM}. \quad (0.28)$$

For the text-independent system, the generic UBM, which may be a GMM, may be used to generate the speaker model using e.g. JFA or i-vector framework. Then, the enrolment may be finished. Here, channel compensation may be done. For recognition, JFA or i-vector framework may be applied, thus allosing computing of $LLR_{ti}$.

Finally, the final log likelihood ratio (LLR) may be obtained as:

$$LLR=\alpha LLR_{td}+\beta LLR_{ti}+\delta. \quad (0.29)$$

The enrolment audio and testing audio may be the same for both systems, so the user may have to say the same lexical content, e.g. (pass)phrase for enrolment and recognition.

In such a method, the transition probabilities and the means of the probability density distribution which may for example be GMM, of the generic UBM of the text-dependent system, which may be a HMM, may be modified in such an approach. Those parameters have been proven to be the most important ones. If an MAP adaption is used, labeling of each adaption feature vector associating one state is required. Such labeling may be done by a suitable algorithm, like the forward-backward algorithm or Viterbi algorithm.

For building the model of the text-independent system for the corresponding phrase and speaker, a suitable approach may also be chosen, such as for example, joint factor analysis or i-vector paradigms as disclosed by Dehak et al. In such a building, the same feature vectors may be used as for adapting the model of the text-dependent system.

As a generic UBM for the text-dependent system, GMM may be used, however the use of HMM is also possible in other embodiments.

Such a method may also comprise the step of verifying whether a test signal was spoken by the target person. In particular, such a verifying step may comprise extracting short time feature vectors from the test signal, e.g. for example from a test phrase or password. Those feature vectors may for example be extracted by MFCC where the parameters may e.g. be a time distance of 10 milliseconds with a 60 dimensional feature vector. Given those feature vectors, a log likelihood ratio of the speaker adapted and non-adapted (generic UBM) model may be computed for the text-independent system ($LLR_{ti}$).

Such a verifying may be done in an unsupervised manner which may have the advantages described before with regard to an unsupervised manner in a verifying step.

Following that, the feature vector of the one speaker may also be compared against the generic model of the text-dependent system (with which $LL_{UBM}$ is found), for example; a HMM and the speaker model of the text-dependent system (with which $LL_{SPK}$ is found) previously built using a suitable algorithm like for example MAP or MLLR using e.g the forward-backward algorithm or Viterbi algorithm. From the two log likelihoods, a combined log likelihood ratio for the text-dependent models may be calculated as:

$$LLR_{td}=LL_{spk}-LL_{UBM} \quad (0.30)$$

The final log likelihood ratio (LLR) may be obtained as a linear combination of the text-dependent and the text-independent log-likelihood ratios to which an independent term is also added. It may be given as:

$$LLR = \alpha LLR_{td} + \beta LLR_{ti} + \delta \qquad (0.31)$$

wherein $LLR_{td}$ is the log likelihood ratio of the text-dependent system and $LLR_{ti}$ is the log likelihood ratio of the text-independent system and $\delta$ is an independent term. The scalar values $\alpha$ and $\beta$ which are the coefficients for the text-dependent log likelihood ratio and the text-independent log likelihood ratio and independent term $\delta$ may be trained during a development session with external data, which is usually independent of the speaker. The term $\delta$ may be used because of the physical meaning of LLR.

The LLR may be used in forensic scenarios, for example, LLR may represent the ratio between the hypothesis that the two audios one is comparing have been spoken by the same person and the hypothesis that both audios have not been spoken by the same person.

Then, LLR higher than 0 may mean that it is more probable that both audios have been spoken by the same person that they have not been spoken by the same person.

However, it may not be simple and the threshold may not usually be 0 because one may have to consider the priori information which may take into account some other information that may not be the voice, and the penalties of having an error (false acceptance and false rejection).

Because of that it may be important that the LLR may be well-calibrated. In that case a threshold may be fixed considering the priori information and the costs of the errors very easily.

Because of that, $\delta$ may be required and trained. In some other embodiments, $\delta$ may be set to 0.

Such a linear combination of the two log likelihood ratios of the text-dependent and the text-independent system allow with the appropriate training to achieve better results than when using a text-dependent or a text-independent system only. Again, for the verification, the final log likelihood ratio LLR may be compared against a threshold.

Such a method may also comprise the step of identifying a target person by identifying the speaker adapted model with the highest likelihood score as possible target speaker before verifying that the test signal was spoken by that speaker.

The invention also comprises a computer readable medium comprising computer readable instructions for executing one of the methods described above when executed or run on a computer.

The invention further comprises a system comprising means adapted to execute one of the methods described above.

BRIEF DESCRIPTION OF THE DRAWINGS

The invention is further explained with the figures, wherein

FIG. 1 shows state of the art text-dependent systems; and

DETAILED DESCRIPTION OF THE PREFERRED EMBODIMENTS

In FIG. 1, a prior art speaker recognition system is explained.

Starting from an audio signal a transcription of the text is extracted. Following that, a starting point HMM may be created from the generic UBM using the transcription or an estimation of the transcription. Then, a speaker adapted HMM may be generated using the audio signal and the starting point HMM. For the adaptation a suitable algorithm like MAP or MLLR may be used which may further use one or more suitable algorithms thus, e.g., in some cases Viterbi or forward-backward algorithm may be needed also.

Following that, during the testing phase, a suitable algorithm like for example Viterbi and/or forward-backward algorithms may be used for deciding whether the target person is indeed the one who has spoken the test signal. Such a decision may be done by comparing a score against a set threshold.

Figure 2A:
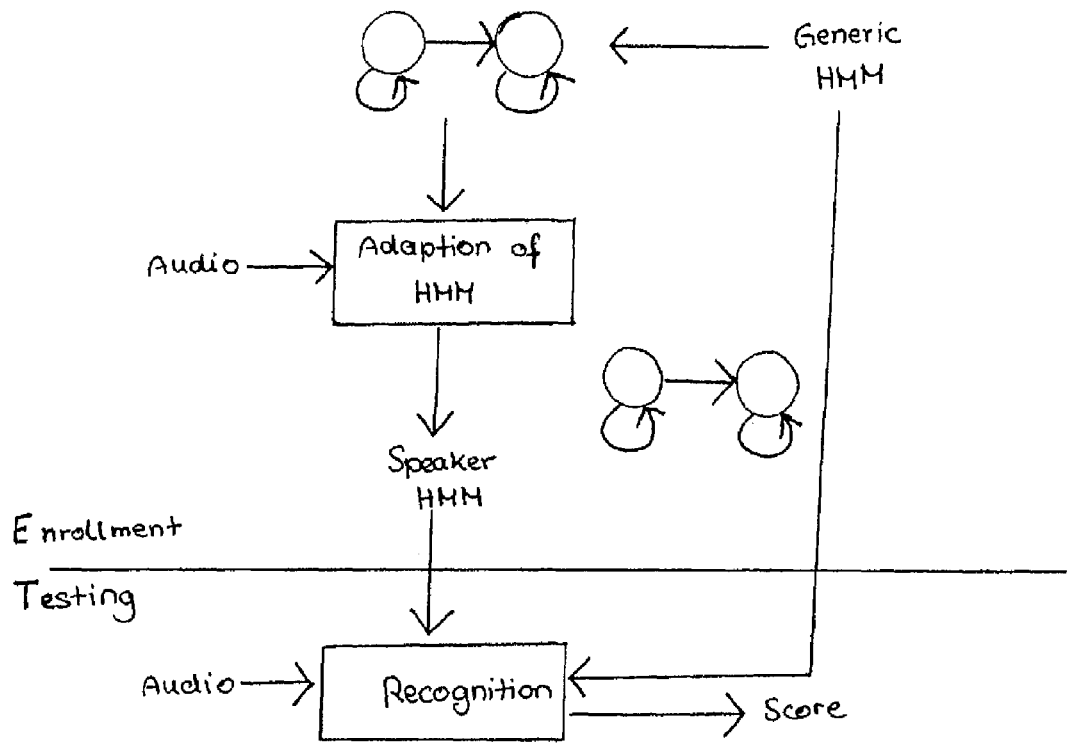
FIG. 2 shows a system comprising aspects of the invention.

FIG. 2a shows an exemplary embodiment of a system according to one embodiment of the invention.

In particular, starting out from a generic UBM, the generic UBM, which may be a HMM, may be adapted using one or more utterances, e.g. audio signals. Thus a speaker adapted HMM may be generated. As can be seen, in such a system, no transcription of the content of the audio file may be necessary.

After the enrolment phase, testing may be done using the speaker adapted HMM in combination with a testing audio file and also using the generic UBM. A decision may then be made about the verification comparing the log likelihood ratio of the modified speaker model and the non-modified generic UBM against a threshold.

FIG. 2 may represent a text-dependent solution wherein the channel is compensated or a text-dependent solution wherein the channel is not compensated. However, FIG. 2 does not show a text-independent solution which may also be used in some embodiments of the invention.

In particular, in some embodiments, wherein the channel is not compensated in the text-dependent system, a fusion of the score with the score of the text-independent system may be necessary (not shown).

Figure 2B:
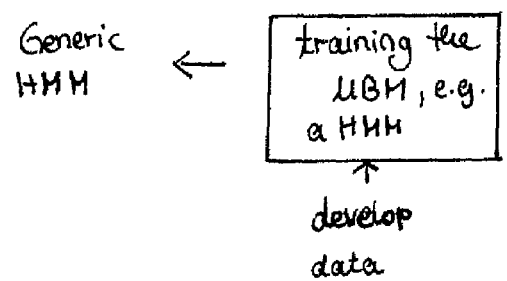

FIG. 2b shows the step of training the universal background model. This step may optionally be present in a system according to the invention and/or a system as shown in FIG. 2a.

For such a training, typically developed data is used. By training the UBM, a generic UBM, for example in this figure, a generic HMM is derived.

Figure 3:
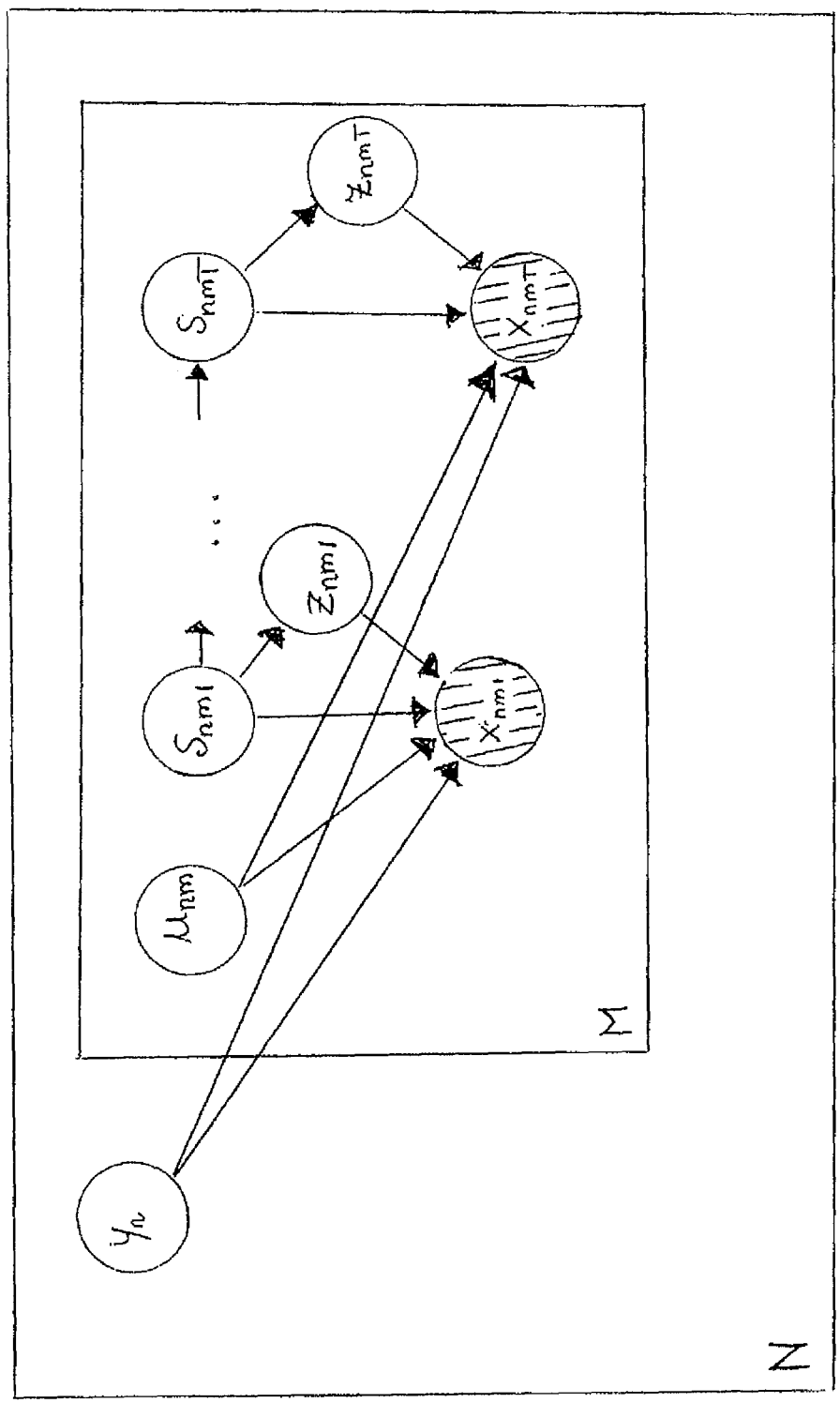
FIG. 3 shows a Bayesian Network which may be used for aspects of the present invention.

FIG. 3 shows a schematic sketch of a Bayesian network which may be used for some aspects of the present invention. In particular, the Bayesian network represents the dependencies of parameters which may be used to describe a model used in the present invention.

In this representation, empty nodes denote hidden variables and shaded nodes denote observed variables. A node, or group of nodes, surrounded by a box labeled with some indication, for example N or M, indicates that there are N or M nodes or group of nodes of that kind, for example one for each of the N speakers or one for each of the M utterances.

Arcs between nodes point from the parent variable to the child variable, meaning that they point from a variable to variables that depend on the variable. Thus, such a Bayesian network represents the conditional dependencies between parent and children variables.

In particular, in FIG. 3, the $x_{nmt}$ which may be continuous observed random vector variable of dimension D are shown. In the shown example, they are dependent on $y_n$, which are continuous hidden random vector variable of dimension R. Each $x_{nmt}$ is also dependent on $u_{nm}$, in this example a continuous hidden random vector variable of dimension R describing channel factors and on $s_{nmt}$, which is usually a discrete hidden random vector variable of dimension Q, describing the active state generating it.

Each $x_{nmt}$ is also dependent on $z_{nmt}$, the active component generating the feature vector $x_{nmt}$ which is usually a discrete hidden random vector variable of dimension C. $z_{nmt}$ depends on $s_{nmt}$.

$s_{nmt}$ depends on $s_{nmt-1}$ starting beginning for t=2. $s_{nm1}$ is not dependent on any of the variables in the Bayesian network shown herein.

As can be seen, there are N×M groups comprising $u_{nm}$, $s_{nmt}$, $z_{nmt}$, and $x_{nmt}$. There are N plates comprising $y_n$, each comprising for a particular n (speaker), and N×M plates comprising each of the variables $u_{nm}$, $s_{nmt}$, $z_{nmt}$, and $x_{nmt}$, for a particular n (speaker) and m (utterance).

Figure 4:
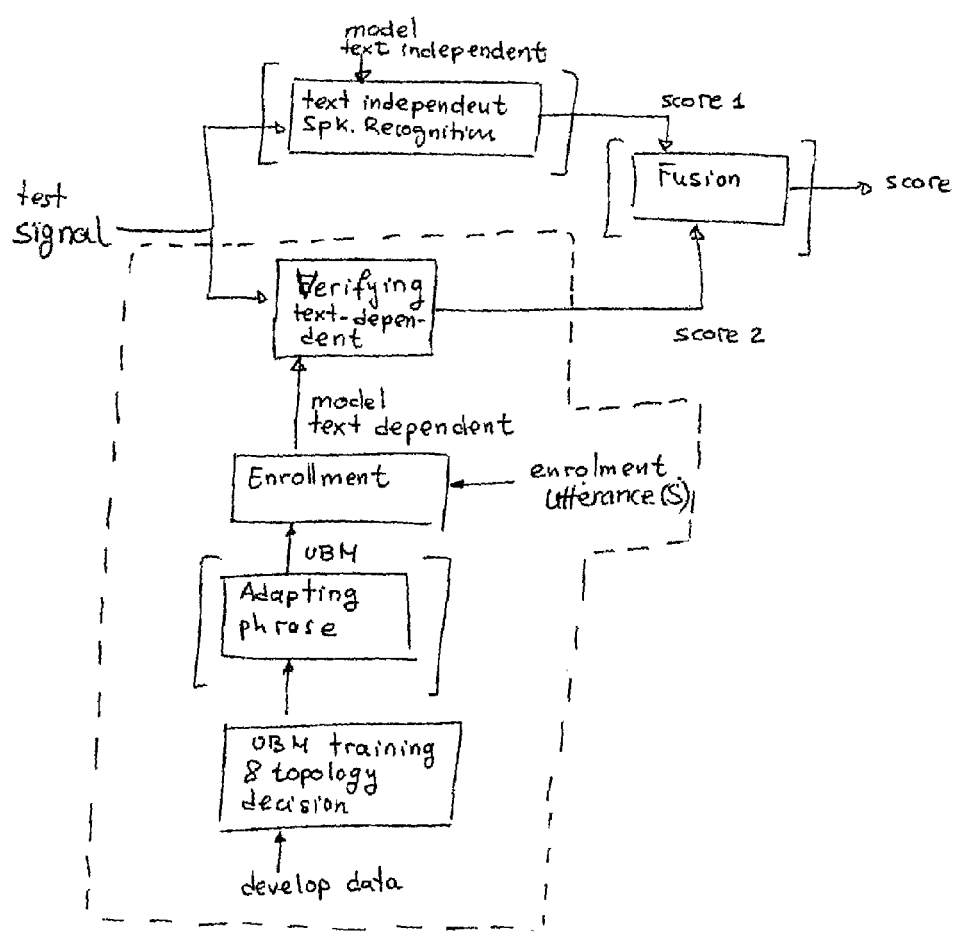
FIG. 4 shows exemplary steps which may be present in some embodiments of the invention.

FIG. 4 shows exemplary steps which may be present in some embodiments of the invention. It is intended to give an overview over different embodiments comprised by the invention. In some embodiments, 1, 2, 3, 4, or more steps as shown in FIG. 4 may not be present. In particular, each of those steps as shown in said figures may be an optional step in a method according to the invention and corresponding systems.

Starting from develop data, a UBM may be trained. This training may be done an unsupervised manner, for example, using utterances of several speakers. For example, several (e.g. as many possible) free speech conversations may be used for the training to prepare the UBM for any utterance that may be desired.

During the training, the topology of the UBM may be selected. For example, it may be selected to comprise a transition probability from each possible state to itself and each other possible state.

In some embodiments, the number of states may be fixed during the training.

Optionally, after the training, the UBM may be adapted to a lexical content, for example, a passphrase or a password. This may be done by adapting one or more parameters, for example, the number of states to said lexical content.

As a next step, using one or more enrollment utterances of a particular speaker, a speaker adapted model may be derived from the generic UBM. Typically, such a model is a text-dependent model.

The invention may further comprise the step of verifying based on a test signal that the test signal was spoken by a target person. Such a verifying may be done in unsupervised manner, where no transcription or approximation of the lexical content may be necessary. In other exemplary embodiments, it may be done in a supervised manner.

From the verifying step, a score (in the figure, score 2) is derived. Such a score 2 may e.g. be a log likelihood ratio or a likelihood ratio. It may be compared to a threshold directly.

In other embodiments, the test signal may also be analyzed by text-independent speaker recognition based on a text-independent model. From analyzation, a verification score 1 may be derived. Optionally, in a method according to the invention, these two scores (score 1 and score 2) may be fused, for example as previously described in equation 0.29 and a general score may be derived. This general score may be compared to a threshold or evaluated in a different manner.

Annex I

Given the feature vectors for one utterance, m, and speaker n $X=\{x_{nm1}, x_{nm2}, x_{nmt}, \ldots, x_{nmT}\}$, where T is the total number of feature vectors, and one HMM defined by:

$\Pi=\{\Pi_{qq'}\}$, the transition probabilities, which are associated to the arcs and represent the probability of "moving" from state q to state q'.

$\Pi_0=\{\Pi_{0q}\}$, the initial state distribution, which are associated to the states and are the initial probabilities of each state q.

$\lambda_q$, Observation probability distribution, which is associated to the state q and is a GMM, defined by:

$P_{qc}$: a priori probability of Gaussian c of state q.

$\lambda_{qc}(x)=N(x; \mu_{qc}, \Psi_{qc})$: where $\mu_{qc}$ and $\Psi_{qc}$ are the mean and covariance matrix of Gaussian c of state q.

We can define the probability of producing the sequence $\{x_{nm1}, x_{nm2}, \ldots, x_{nmt-1}\}$ of speaker n and utterance m while ending up in state q at time t as $\alpha_q(t)$:

$$\alpha_q(t) = \lambda_q(x_{nmt})\sum_j \Pi_{jq}\alpha_j(t-1) \quad (1.1)$$

where $$\lambda_q(x_{nmt}) = \sum_c P_{qc}\lambda_{qc}(x_{nmt})$$

is the likelihood of the state q for $x_{nmt}$. We can define the probability of producing the sequence $\{x_{nmt}, x_{nmt+1}, \ldots, x_{nmT}\}$ of speaker n and utterance m, given that we are at state q at time t as $\beta_q(t)$:

$$\beta_q(t) = \sum_j \Pi_{qj}\beta_j(t+1)\lambda_j(x_{nmt+1}) \quad (1.2)$$

In this Annex, the dependency of speaker n and/or utterance m is explicitly mentioned. The dependency/dependencies may, however, be optional and/or mentioning them may not be necessary and be omitted for clarity reasons, e.g. because it is clear that one considers the model for a given speaker n and/or a certain utterance m. Although m superscript and n subscript could be included for α and β, they are omitted to simplify the notation.

Finally, the probability of being in Gaussian c of state q at time t for speaker n and utterance m is $\gamma_{nqc}^m(t)$:

$$\gamma_{nqc}^m(t) = \frac{\beta_q(t)P_{qc}\lambda_{qc}(x_{nmt})\sum_j \Pi_{jq}\alpha_j(t-1)}{\sum_j \alpha_j(t)\beta_j(t)} \quad (1.3)$$

The initialization values for use in an algorithm, e.g. forward-backward algorithm, may be $\alpha_i(1)=\Pi_{0i}$ and $\beta_i(T+1)=1$.

Annex II

Expectation Maximization Algorithm

Given the develop data X, the auxiliary function $Q(\theta|\theta^{(k)})$ may be computed, where $\theta=\{\mu_{qc}, W_{qc}, V_{qc}, \Pi_0, \Pi_q, P_q, \Psi_{qc}\}$, and $\theta^{(k)}$ may represent the parameters of the previous iteration.

The auxiliary function may be obtained from (0.27) as mentioned previously in the description.

Thus, one may get $$Q(\theta|\theta^{(k)}) = \text{const}(y_n) + \text{const}(u_{nm}) + E\left[\sum_{n,m}^{N,M}\sum_{q}^{Q} s_{nm1q}\log(\Pi_{0q}) + \sum_{n,m,t>1}^{N,M,T}\sum_{q,q'}^{Q,Q}(s_{nmt-1q}s_{nmtq'})\log(\Pi_{qq'})|X,\theta^{(k)}\right] + \quad (2.1)$$

$$E\left[\sum_{n,m,t}^{N,M,T}\sum_{q,c}^{Q,C}(s_{nmtq}z_{nmtc})(\log(P_{qc}) + \log(f(x_{nmt}|y_n,u_{nm},s_{nmtq=1},z_{nmtc=1})))\middle|X,\theta^{(k)}\right]$$

Herein, the operator $E[*|X,\theta^{(k)}]$ is the expected value of * given X and the parameters of the previous iteration of the HMM-UBM the (generic) UBM which is HMM.

The first and second addends, which usually depend on the speaker factors and channel factors, respectively, are not usually relevant for the posterior operations. The third and last addends will usually be renamed as $Q_M(\theta|\theta^{(k)})$ and $Q_X(\theta|\theta^{(k)})$, respectively, for simplicity:

$$Q_M(\theta|\theta^{(k)}) = \sum_{n,m,q}^{N,M,Q}\langle s_{nm1q}\rangle_X^{(k)}\log(\Pi_{0q}) + \sum_{n,m,t>1}^{N,M,T}\sum_{q,q'}^{Q,Q}\langle s_{nmt-1q}s_{nmtq'}\rangle_X^{(k)}\log(\Pi_{qq'}) \quad (2.2)$$

$$Q_X(\theta|\theta^{(k)}) = \sum_{n,m,t}^{N,M,T}\sum_{q,c}^{Q,C}\langle s_{nmtq}z_{nmtc}\rangle_X^{(k)}\left(\log(P_{qc}) - \frac{1}{2}|\Psi_{qc}| - \frac{1}{2}(x_{nmt} - A_{qc}\langle b_{nm}\rangle_X^{(k)})^T\Psi_{qc}^{-1}(x_{nmt} - A_{qc}\langle b_{nm}\rangle_X^{(k)}) + cons\right) \quad (2.3)$$

$$A_{qc} = [W_{qc}V_{qc}\mu_{qc}] \quad (2.4)$$

$$b_n = [y_n^T u_{n1}^T \ldots u_{nM}^T 1]^T \Rightarrow b_{nm} = [y_n^T u_{nm}^T 1]^T \quad (2.5)$$

The operator $\langle *\rangle_X^{(k)}$ is the expected value of * given X and $\theta^{(k)}$. Thus, the means and eigenchannel and eigenvoice matrices (2.4) and the speaker and channel factors (2.5) may be represented in a compact way. Once the auxiliary function is defined, Expectation and Maximization steps are typically combined iteratively to train the HMM-UBM.

Expectation and maximization can be used alternatively.
Expectation Step
The goal of the expectation step (E), is to compute the expected values $\langle s_{nmtq}z_{nmtc}\rangle_X^{(k)}, \langle b_{nm}\rangle_X^{(k)}, \langle b_{nm}b_{nm}^T\rangle_X^{(k)}, \langle s_{nm1q}\rangle_X^{(k)}$ and $\langle s_{nmt-1q}s_{nmtq}\rangle_X^{(k)}$. The first expected value can be found as:

$$\langle s_{nmtq}z_{nmtc}\rangle_X^{(k)} = p(s_{nmtq=1}|X_{nm},\theta^{(k)})p(z_{nmtc=1}|s_{nmtq=1}, X_{nm},\theta^{(k)}) \quad (2.6)$$

$X_{nm}$ is the sequence of the develop feature vectors for the speaker n and utterance m. The first multiplicative term of the expression (2.6) is the probability that $x_{nmt}$ activates the state q, given $X_{nm}$ and the parameters of the previous iteration of the HMM-UBM. The second term is the probability that $x_{nmt}$ activates the component c, given the state q is activated, and given $X_{nm}$ and the parameters of the previous iteration of the HMM-UBM $\theta^{(k)}$.

Computing (2.6) exactly may be very costly because the hidden variables $y_n$ and $u_{nm}$ are usually unknown. It would usually be much easier if those variables were known.

In one embodiment the two variables $y_n$ and $u_{nm}$ are thus estimated for the computation of (2.6) to make it less costly. The estimation of the hidden channel and speaker factors may for example be done as explained in the next steps:

The first dimensions ($D_{mx}$) of $y_n$ and $u_{nm}$ are sampled, leaving the rest as 0. $D_{mx}$ may be a number between 1 and R (if $y_n$ is sampled) or 1 and R' (if $u_{nm}$ is sampled). A typical value for the first dimensions to be sampled may be between 2 and 20, e.g. between 8 and 12, and/or more than 5, e.g. more than 10. It is usually assumed that both variables follow a normal distribution with 0 mean and unity standard deviation as mentioned e.g. in (0.21) and (0.22) (mentioned above). Thus, a reasonable sampling may be provided.

Sampling may for example be done in a uniform manner. For example, when assuming one dimension, the sampling may be done in a uniformed manner between $\mu-k\sigma$, where $\sigma$ is the expected standard deviation of the random variable in the assumed dimension and $\mu$ is the expected mean of the random variable in the assumed dimension, and $\mu+k\sigma$.

Herein, $\mu$ may be estimated as 0 and set to that value as mentioned in the before described model, where $\sigma$ may be estimated as 1 and set to that value as mentioned in the before described model, and where k may be chosen, e.g. where k may be set to 1, 2, 3 or more.

Such a sampling may be done independently for each dimension.

Sampling may in other embodiments be done with a grid in combination with independent uniform sampling of some dimensions.

In other embodiments, the sampling may be done in a grid as explained further below.

The first dimensions of $y_n$ and $u_{nm}$ may be sampled in different ways e.g. in a uniform manner between $\mu-k\sigma$ and $\mu+k\sigma$ independently in each dimension and/or in a grid.

The number of sampled dimensions usually depends on resources, the computational time and the required accuracy. Usually, sampling more dimensions provides more accurate results, but requires more resources and computational time. In one embodiment, it may be done sequentially, in another it may be done using a grid. If the sampling is sequential, one dimension is not considered until the previous one is fixed. For example, the first two previous steps could be applied for the first dimension of $y_n$ and $u_{nm}$ (the rest of the dimensions would be set to 0). After that, the L selected values may be fixed and the sampling may then be applied over the second dimension, taking the new L preferred sampled vectors, and so on.

When using a grid, it is usually $D_{mx}$-dimensional and all the elements of the grid are typically analyzed looking for the L selected sampled estimations of $y_n$ and $u_{nm}$. Furthermore, $\hat{y}_n^l$ and $\hat{u}_{nm}^l$ could for example be refined using maximization by gradient. In that case, the previous selected sampled estimations would be considered as the initial points for the searching by gradient based techniques. Explanations on gradient based techniques can e.g. be found in the publication by Stephen Boyd and Lieven Vandenberghe, 2004, "Convex Optimization", Cambridge University Press, New York, N.Y., USA.

Finally, in the sampling procedure the following constraint is usually introduced: $y_n$ must be the same for all the utterances of the same speaker, n, while $u_{nm}$ may be different for each utterance.

Given a group of sampled versions of $y_n$ and $u_{nm}$ ($\hat{y}_n^l$ and $\hat{u}_{nm}^l$, where l indicates the sampled version), a suitable algorithm, e.g. Viterbi algorithm may be used to determine the preferred sampled versions (those which provide highest likelihood). Thus, the observation probability distribution of $x_{nmt}$ given the state q and component c are activated, the sampled speaker factor $\hat{y}_n^l$, the sampled channel factor $\hat{u}_{nm}^l$ and iteration k may follow a multivariante normal distribution as indicated in (2.7):

$$x_{nmt}|s_{nmtq}=1, z_{nmtc}=1, \hat{y}_n^l, \hat{u}_{nm}^l(k) \sim N_D(\mu_{qc}^{(k)} + W_{qc}^{(k)}\hat{y}_n^l + V_{qc}^{(k)}\hat{u}_{nm}^l, \Psi_{qc}^{(k)}) \quad (2.7)$$

where $\mu_{qc}^{(k)}$, $W_{qc}^{(k)}$, $V_{qc}^{(k)}$ and $\Psi_{qc}^{(k)}$ are the mean, the eigenvoice matrix, the eigenchannel matrix and the covariance matrix of the state q and component c of the previous iteration of the HMM-UBM, respectively. (2.7) can be derived from (0.26), mentioned previously in the description.

Once the L preferred sampled versions have been selected, (L could be one or more than one), $\hat{y}_n^l$ and $\hat{u}_{nm}^l$, the sequence of states and components which are activated by X can be extracted, given each one of the preferred sampled versions and the previous iteration of HMM-UBM.

Then, for example, if L=1, $<s_{nmtq}z_{nmtc}>_X^{(k)}$ is 1 if the state q and component c are activated by the feature vector (frame) $x_{nmt}$, or 0 otherwise, given X and the previous iteration of HMM-UBM.

Once the preferred sampled vectors, $\hat{y}_n^l$ and $\hat{u}_{nm}^l$ have been found, the corresponding sequences of active states and components can be obtained, for X given $\theta^{(k)}$, using an algorithm, e.g. Viterbi algorithm, and (2.7). After that, one can compute:

$$\langle s_{nmtq}\rangle_X^{(k)} = \sum_l^L p(\hat{S}^l, \hat{Z}^l | X_{nm}, \theta^{(k)}) \langle s_{nmtql}\rangle_X^{(k)} \quad (2.8)$$

$$\langle s_{nmtq}z_{nmtc}\rangle_X^{(k)} = \sum_l^L p(\hat{S}^l, \hat{Z}^l | X_{nm}, \theta^{(k)}) \langle s_{nmtql}z_{nmtcl}\rangle_X^{(k)} \quad (2.9)$$

$$\langle s_{nmt-1q}s_{nmtq'}\rangle_X^{(k)} = \sum_l^L p(\hat{S}^l, \hat{Z}^l | X_{nm}, \theta^{(k)}) \langle s_{nmt-1ql}s_{nmtq'l}\rangle_X^{(k)} \quad (2.10)$$

where $\hat{S}^l$ and $\hat{Z}^l$ are the sequences of active states and components with l marking a selected sampled vector, $\hat{y}_n^l$ and $\hat{u}_{nm}^l$; $<s_{nmtql}>_X^{(k)}$ is 1 if $x_{nmt}$ activates the state q, given X, $\hat{y}_n^l$, $\hat{u}_{nm}^l$ and the previous iteration of HMM-UBM, or 0 otherwise.

$<s_{nmtql}z_{nmtcl}>_X^{(k)}$ is 1 if $x_{nmt}$ activates the state q and component c, given X, $\hat{y}_n^l$, $\hat{u}_{nm}^l$ and the previous iteration of HMM-UBM, or 0 otherwise.

$<s_{nmt-1ql}s_{nmtq'l}>_X^{(k)}$ is 1 if $x_{nmt-1}$ activates the state q and $x_{nmt}$ activates the state q', given X, $\hat{y}_n^l$, $\hat{u}_{nm}^l$ and the previous iteration of HMM-UBM, or 0 otherwise.

$p(\hat{S}^l, \hat{Z}^l | X_{nm}, \theta^{(k)})$ is the probability of the sequences $\hat{S}^l$ and $\hat{Z}^l$, given $X_{nm}$ and the previous iteration of HMM-UBM. The computation of this term will be analyzed further below.

To complete the Expectation step (E), $<b_n>_X^{(k)}$ and $<b_n b_n^T>_X^{(k)}$ have to be computed. $<b_{nm}>_X^{(k)}$ and $<b_{nm}b_{nm}^T>_X^{(k)}$ can be obtained by marginalization. The first variable can be approximated as:

$$\langle b_n\rangle_X^{(k)} \simeq \sum_l^L p(\hat{S}^l, \hat{Z}^l | X_n, \theta^{(k)}) E[b_n | \hat{S}^l, \hat{Z}^l, X_n, \theta^{(k)}] \quad (2.11)$$

Note that the exact expression for $<b_n>_X^{(k)}$ should consider all possible sequences for activated states and components. However, in (2.11) only those obtained from $\hat{y}_n^l$ and $\hat{u}_{nm}^l$ have been considered. Thus, given $\hat{S}^l, \hat{Z}^l$, the sequence $X_n$ follows a normal distribution as:

$$X_n|\hat{S}^l, \hat{Z}^l, (k) \sim N(\bar{\mu}_n^{(k)l}, \bar{A}_n^{(k)l}\bar{A}_n^{(k)l^T} + \bar{\Psi}_n^{(k)l}) \quad (2.12)$$

Here $X_n$ is the sequence of the feature vectors for speaker n and all the utterances M, in a matrix format (2.13), $\hat{\mu}_n^{(k)l}$ is the sequence of the mean vectors of the active components given by the sequence $\hat{S}^l, \hat{Z}^l$, in matrix format (2.14), $\bar{A}_n^{(k)l}$ includes the eigenvoice and eigenchannel matrices of the active components given by the sequence $\hat{S}^l, \hat{Z}^l$, in matrix format (2.15), and $\hat{\Psi}_n^{(k)l}$ includes the covariance matrices of the active components given by the sequence $\hat{S}^l, \hat{Z}^l$, in matrix format (2.16). In all cases, the previous iteration of the HMM-UBM and the speaker n (with all the utterances) is considered. The sequence $\hat{S}^l, \hat{Z}^l$ was built with $\hat{y}_n^l$ and $\hat{u}_{nm}^l$:

$$X_n = \begin{bmatrix} x_{n11} \\ \vdots \\ x_{nM1} \\ \vdots \\ x_{nMT} \end{bmatrix} \quad (2.13)$$

$$\bar{\mu}_n^{(k)l} = \begin{bmatrix} \mu_{n11}^{(k)l} \\ \vdots \\ \mu_{nM1}^{(k)l} \\ \vdots \\ \mu_{nMT}^{(k)l} \end{bmatrix} \quad (2.14)$$

$$\bar{A}_n^{(k)l} = \begin{bmatrix} W_{n11}^{(k)l} & V_{n11}^{(k)l} & 0 & \cdots & 0 \\ \vdots & \vdots & \vdots & & \vdots \\ W_{n1T}^{(k)l} & V_{n1T}^{(k)l} & 0 & \cdots & 0 \\ \vdots & & 0 & \ddots & \vdots \\ W_{nM1}^{(k)l} & & 0 & 0 & V_{nM}^{(k)l} \\ \vdots & \vdots & \vdots & \vdots & \vdots \\ W_{nMT}^{(k)l} & & 0 & 0 & V_{nMT}^{(k)l} \end{bmatrix} \quad (2.15)$$

$$\Psi_n^{(k)l} = \begin{bmatrix} \Psi_{n11}^{(k)l} & & & & & 0 \\ & \ddots & & & & \\ & & W_{n1T}^{(k)l} & & & \\ & & & \ddots & & \\ & & & & W_{nM1}^{(k)l} & \\ 0 & & & & & \ddots \\ & & & & & & W_{nMT}^{(k)l} \end{bmatrix} \quad (2.16)$$

Thus, if the first feature vector of the first utterance of the speaker n, $x_{n11}$, activates the state q and component c, given the sequence $\hat{S}^1, \hat{Z}^l$ obtained with the previous iteration of the HMM-UBM and $\hat{y}_n^l$ and $\hat{u}_{nm}^l$, the terms $\mu_{n11}^{(k)l}$, $W_{n11}^{(k)l}$, $V_{n11}^{(k)l}$ and $\Psi_{n11}^{(k)l}$ Correspond to State q and component c. The second subscript of the previous variables represents the utterance, m, and the third one, the corresponding feature vector, t.

According to (2.5), $<b_n>_X^{(k)}$ can be expressed as:

$$\langle b_n\rangle_X^{(k)} = \begin{bmatrix} \langle \tilde{b}_n\rangle_{X_n}^{(k)} \\ 1 \end{bmatrix} \quad (2.17)$$

In this case, X may be constrained to the features associated to speaker n. Thus, $<\tilde{b}_n>_{X_n}^{(k)}$ can be approximated as:

$$\langle \tilde{b}_n \rangle_{X_n}^{(k)} \simeq \sum_l^L p(\hat{S}^l, \hat{Z}^l | X_n, \theta^{(k)}) \quad (2.18)$$

$$\left(I_{R''} + \overline{A}_n^{(k)l^T} \Psi_n^{(k)l} \overline{A}_n^{(k)l}\right) \overline{A}_n^{(k)l^T} \Psi_n^{(k)l^{-1}} (X_n - \overline{\mu}_n^{(k)l})$$

$$\Sigma_n^{(k)l} = \overline{A}_n^{(k)l} \overline{A}_n^{(k)l^T} + \Psi_n^{(k)l} \quad (2.19)$$

$\langle b_n b_n^T \rangle_X^{(k)}$ follows the expression:

$$\langle b_n b_n^T \rangle_X^{(k)} \simeq \sum_l^L p(\hat{S}^l, \hat{Z}^l | X_n, \theta^{(k)}) \left(I_{R''} \left| \overline{A}_n^{(k)l^T} \Psi_n^{(k)l^{-1}} \overline{A}_n^{(k)l} \right| \right)^{-1} \quad (2.20)$$

Where $I_{R''}$ is the identity matrix of dimension R''=R+R'M. Now $p(\hat{S}^l, \hat{Z}^l | X_n, \theta^{(k)})$ is computed in order to complete the E step:

$$p(\hat{S}^l, \hat{Z}^l | X_n, \theta^{(k)}) \simeq \frac{p(\hat{S}^l, \hat{Z}^l | \theta^{(k)}) p(X_n | \hat{S}^l, \hat{Z}^l, \theta^{(k)})}{\sum_l^L p(\hat{S}^l, \hat{Z}^l | \theta^{(k)}) p(X_n | \hat{S}^l, \hat{Z}^l, \theta^{(k)})} \quad (2.21)$$

$p(\hat{S}^l, \hat{Z}^l | \theta^{(k)})$ is the probability of the sequence $\hat{S}^l, \hat{Z}^l$, given the previous iteration of the HMM-UBM for speaker n. It can be computed from the prior probability of the first active state, $\Pi_{0nm}^{(k)l}$, the transition probabilities of the active states for each time index, $\Pi_{nmt}^{(k)l}$, and the prior probabilities of the active components, $P_{nmt}^{(k)l}$, given the l-th selected sampled vectors $\hat{y}_n^l$ and $\hat{u}_{nm}^l$, and the previous iteration of the HMM-UBM as:

$$p(\hat{S}^l, \hat{Z}^l | \theta^{(k)}) = \prod_m^M \Pi_{0nm}^{(k)l} \prod_t^T \Pi_{nmt}^{(k)l} \prod_t^T P_{nmt}^{(k)l} \quad (2.22)$$

$p(X_n | \hat{S}^l, \hat{Z}^l, \theta^{(k)})$ is the probability of the sequence of feature vectors $X_n$ for speaker n given the sequence $\hat{S}^l, \hat{Z}^l$ and the previous iteration of the HMM-UBM. There are at least two alternative ways to estimate $p(X_n | \hat{S}^l, \hat{Z}^l, \theta^{(k)})$. In one embodiment, the estimation may assume that $$p(X_n | \hat{S}^l, \hat{Z}^l, \theta^{(k)}) \simeq p(X_n | \hat{y}_n^l, \hat{u}_n^l, \hat{S}^l, \hat{Z}^l) \quad (2.23)$$

where $\hat{u}_n^l$ all the estimated channel factors of speaker n. It is assumed that the pdf of $X_n | \hat{y}_n^l, \hat{u}_n^l, \hat{S}^l, \hat{Z}^l$ decreases very sharply when the speaker and channel factors vary from the expected ones. Sharply means that the distribution concentrates most of the data close to the expected values. This assumption is required in order to use the approximation of (2.23). (2.23) can be obtained using a suitable algorithm, e.g. Viterbi algorithm, and (2.7), mentioned previously.

Alternatively, in another embodiment, $p(X_n | \hat{S}^l, \hat{Z}^l, \theta^{(k)})$ may be computed assuming that $X_n | \hat{S}^l, \hat{Z}^l, \theta^{(k)} \sim N(\overline{\mu}_n^{(k)l}, \Sigma_n^{(k)l})$ (2.24).

Maximization Step

Maximization, (M), step comprises deriving the auxiliary function (2.1) concerning the variables one wants to estimate. Thus, the prior probability of the state q for iteration (k+1) may be calculated (using (2.8)), mentioned previously as:

$$\Pi_{0q}^{k+1} = \frac{\sum_{n,m}^{N,M} \langle s_{nm1q} \rangle_X^{(k)}}{NM} \quad (2.25)$$

The transition probabilities between state q and q' for iteration (k+1) is found as (using (2.10)), mentioned previously:

$$\Pi_{qq'}^{(k+1)} = \frac{\sum_{n,m,t>1}^{N,M,T} \langle s_{nmt-1q} s_{nmtq'} \rangle_X^{(k)}}{\sum_{n,m,t>1}^{N,M,T} \sum_{q'}^Q \langle s_{nmt-1q} s_{nmtq'} \rangle_X^{(k)}} \quad (2.26)$$

The mean vectors, eigenvoices matrices and eigenchannels matrices (2.4) for state q and component c may be computed as (2.27) using (2.9), (2.17), (2.18) and (2.20), (mentioned previously):

$$A_{qc}^{(k+1)} = \sum_{n,m,t}^{N,M,T} \langle s_{nmtq} z_{nmtc} \rangle_X^{(k)} \quad (2.27)$$

$$x_{nmt} (\langle b_{nm} \rangle_X^{(k)})^T \left( \sum_{n,m,t}^{N,M,T} \langle s_{nmtq} z_{nmtc} \rangle_X^{(k)} \langle b_{nm} b_{nm}^T \rangle_X^{(k)} \right)^{-1}$$

The covariance matrix for state q and component c may be extracted as (2.28) using (2.9), (2.17), (2.18) and (2.27), mentioned previously:

$$\Psi_{qc}^{(k+1)} = \text{diag} \left( \frac{\sum_{n,m,t}^{N,M,T} \langle s_{nmtq} z_{nmtc} \rangle_X^{(k)} \left( x_{nmt} x_{nmt}^T - A_{qc}^{(k+1)} \langle b_{nm} \rangle_X^{(k)} x_{nmt}^T \right)}{\sum_{n,m,t}^{N,M,T} \langle s_{nmtq} z_{nmtc} \rangle_X^{(k)}} \right) \quad (2.28)$$

Where the operator diag(*) means that one takes the diagonal of matrix *. Finally, the priori probability for state q and component c is computed as (2.29) using (2.9):

$$P_{qc}^{(k+1)} = \frac{\sum_{n,m,t}^{N,M,T} \langle s_{nmtq} z_{nmtc} \rangle_X^{(k)}}{\sum_{n,m,t}^{N,M,T} \sum_{c'}^C \langle s_{nmtq} z_{nmtc'} \rangle_X^{(k)}} \quad (2.29)$$

In some embodiments, the used equations, e.g. (2.25), (2.26), (2.27), (2.28) and (2.29), do not guarantee that particular boundary conditions are observed. For example, they may not guarantee that speaker and/or channel factors follow a normal distribution with a certain mean value and/or certain co-variances as assumed previously. Thus, in the iterative algorithm and some of the iterations, an additional step may be introduced for maintaining boundary conditions or a step of the algorithm may be replaced with a step for maintaining certain boundary conditions, for example, a step of divergence re-estimation. For example, in some embodiments, equation (2.25), (2.26), (2.27), (2.28) and (2.29) do not guarantee that speaker and channel factors follow a normal distribution with zero mean and identity covariance as in (0.21) and (0.22), (mentioned previously in the description). Because of that, in some iteration steps, M step may be substituted by minimum divergence re-estimation. It may e.g. be done for example once for each 5 iterations or whenever a divergence is found which is higher than a certain threshold.

An explanation about minimum divergence re-estimation may be found in e.g. P. Kenny, "Joint factor analysis of speaker and session variability: Theory and algorithms, Tech Report CRIM-06/08-13," 2005. [Available Online] http://www.crim.ca/perso/patrick.kenny]

Initialization of an EM Algorithm

When an expectation maximization algorithm is used, a first estimation of the complete UBM is required. For the initialization many different techniques or algorithms may be used. The expectation maximization algorithm only leads to a local maximum likelihood. Thus, the initialization is important for good results. The initialization may comprise 1, 2, or more of the following steps.

A full covariance UBM may be trained with develop data X (utterance(s) of one or more speakers) (0.17). For this, the morphology of the desired UBM, (e.g number of states, components . . . ) have to be fixed.

A full covariance UBM may be obtained assuming certain constraints for the covariance matrices, e.g. Factor Analysis (FA) when the amount of data is not sufficient. In other embodiments, no constraints for the covariance matrices are used.

Explanations on factor analysis may be found in e.g. Ghahramani, Zoubin and Geoffrey E. Hinton, "The EM algorithm for mixtures of factor analyzers" Vol. 60. Technical Report CRG-TR-96-1, University of Toronto, 1996. A conventional Expectation Maximization algorithm (as for example mentioned in Dempster et al) may be used for the training with the k-means for initialization Details on k-means may for example be found in Bishop, C. M., and Nasrabadi, N. M. (2006), "Pattern recognition and machine learning" (Vol. 1, p. 740), New York; Springer.

For the first initialization of the eigenvoice and eigenchannel matrix, using the previous full covariance HMM-UBM, and the develop data, the active states and components for each feature vector $x_{nmt}$ (for speaker n, utterance m, time index t) may be extracted, for example by using a suitable algorithm like Viterbi algorithm. Then, for each speaker n, state q, and component c, Singular Value Decomposition may be computed from the difference of the feature vectors that activate the state q and the components c and the corresponding mean vectors.

Singular Value Deposition is for example explained in Gerbrands, J. J. (1981), "On the relationships between SVD, KLT and PCA", Pattern recognition, 14 (1), 367-381.

With the computed eigenvectors, the matrix $W_{qc}$ may be initialized. Matrix $V_{qc}$ may be initialized as 0 matrix (matrix with all entries 0). This may provide a first initialization of the UBM with channel and speaker factors. Herein, the channel factors/eigenchannel matrix may not be considered (assumed as 0).

Then, the expectation maximization algorithm may be applied without considering the $u_{nm}$ and the UBM may be updated using the develop data. $V_{qc}$ is usually not updated (yet), but remains a 0 matrix. Then, the active states and components for each feature vector $x_{nmt}$ (speaker n, utterance m, time index t) may be extracted, for example using a suitable algorithm like Viterbi algorithm. For each speaker n, state q, and component c, Single Value Decomposition may then be computed from the difference of the feature vectors that activate the state q and the components c and the mean vector and $W_{qc} <y_n>_X^{(k)}$. Then, matrix $V_{qc}$ may be initialized with the computed eigenvectors.

Annex III

Speaker Adaptation

Herein, the model may be a UBM comprising a Hidden Markov Model, in particular it may be a HMM. In the following, the case N=1 is discussed (speaker adaptation for one speaker). This is not to be understood as a limitation of the invention. The invention also comprises cases with N=2, 3, 4, 5 or more. However, changing the described method to N=2, 3, 4, 5 or more is straightforward for a person skilled in the art, as the enrollment of each speaker is independent of all other speakers.

Given $X_{spk}$ for one speaker (N=1), and a UBM, preferred sampled versions $\hat{y}_n^1$ and $\hat{u}_{nm}^1$ may be extracted as explained in Annex II. After that, $<y_{spk,n}>_{X_{spk}}$ and $<u_{spk,nm}>_{X_{spk}}$ may be extracted as (2.18) taking into account (2.5) (of Annex II). Superscript (k) is unnecessary in this case because the model is already fixed at this point.

At the same time, a novel estimation for each mean vector (state q component c) may be obtained with those feature vectors which active the state q component c after applying a suitable algorithm, e.g. Viterbi ($\mu_{qc,spk}$). Thus, the maximum likelihood estimation of the mean vector for state q component c may be expressed as:

$$\mu_{qc,spk}^{ML} = \mu_{qc,spk} + W_{qc}<y_{spk,n}>_{X_{spk}} + V_{qc}<u_{spk,nm}>_{X_{spk}} \quad (3.1)$$

In some embodiments, expression (3.1) may be simplified by removing the last addend. This may be advantageous in particular if little enrollment data is available and the channel variability is poor, also when the variability between testing and enrolment sessions is significant. The adapted mean vector for state q component c may be computed using (3.1) and a MAP adaptation as:

$$\mu_{qc,spk}^{MAP} = \xi \mu_{qc}^{HMM-UBM} + (1-\xi)\mu_{qc,spk}^{ML} \quad (3.2)$$

Here, $\xi$ is the memory term, which usually depends on the number of feature vectors used to estimate (3.1), and $\mu_{qc}^{HMM-UBM}$ is the mean vector of the HMM-UBM for state q component c.

The memory term is usually a value between 0 and 1 which may determine the final computation of the mean. It usually depends on the amount of data used in ML (Maximum Likelihood) estimation.

If a lot of data is used for the ML estimation, (3.1), it can be considered very reliable, and the memory term should be close to 0. On the other hand, if (3.1) was computed with few data, memory term should be close to 1, and the final estimation of the mean would be very close to the one of HMM-UBM.

To adapt the eigenvoice matrices, minimum divergence re-estimation may be used. Thus, a novel estimation for each covariance matrix (state q component c) may be obtained with those feature vectors which active the state q component c after applying a suitable algorithm, like e.g. Viterbi algorithm. Thus, $\Sigma_{y,spk}$, the estimated variance of $<y_{spk,n} y_{spk,n}^T>_{X_{spk}}$, may be computed from $<y_{spk,n} y_{spk,n}^T>_{X_{spk}}$, and the corresponding adapted covariance matrix for state q component c may be computed as:

$$W_{qc,spk}^{MD} = W_{qc}^{HMM-UBM} \Sigma_{y,spk}^{1/2} \quad (3.3)$$

Herein, $\Sigma_{y,spk}^{1/2}$ is the estimated standard deviation of $<y_{spk,n} y_{spk,n}^T>_{X_{spk}}$.

Annex IV

In a method according to the invention, given the testing data of a testing speaker r and utterance m, of a certain lexical content $X_{rm}$, the HMM-UBM ((generic) UBM which is a HMM) and the speaker n HMM model (speaker adapted model for speaker n which is a speaker adapted HMM), $HMM_n$ for the same lexical content, where r and n can be the same speaker or not, a likelihood ratio may be computed as measure of similarity between the testing data and the speaker n model:

$$LR = \frac{p(X_{rm} | HMM_n)}{p(X_{rm} | HMM - UBM)} \quad (4.1)$$

Thus, here the likelihood of the utterance m of testing speaker r in the $HMM_n$ is compared to the likelihood of it in the HMM-UBM. In one model previously described, wherein L preferred sampled versions of $y_r$ and $u_{rm}$ are selected, once the L preferred sampled versions of $y_r$ and $u_{rm}$ have been selected (L could be one or more than one), $\hat{y}_r^l$ and $\hat{u}_{rm}^l$, the sequence of states and components may be extracted which are activated by each one of the preferred sampled versions, given $X_{rm}$ and $HMM_n$ and HMM-UBM.

Thus, the numerator and denominator of (4.1) can be computed as the denominator of (2.21) of Annex II, although in this case, $\hat{y}_r$ and $\hat{u}_r$ could be substituted by $<y_r>_{X_{rm}}$ and $<u_r>_{X_{rm}}$ in some embodiments, e.g. when $p(X_r|\hat{S}^l,\hat{Z}^l,\theta^{(R)}) \approx p(X_r|\hat{y}_r^m,\hat{u}_r^l,\hat{S}^l,\hat{Z}^l)$ (as assumed in (2.23) mentioned in a previous Annex).

Once (4.1) is computed, the final decision may be accepted or rejected depending on whether the LR is higher or lower than a given threshold, respectively.

In some embodiments, instead of a likelihood ratio, a log likelihood ratio (log of the likelihood ratio) may be determined.

What is claimed is:

1. A method for text-dependent Speaker Recognition using a speaker model obtained by adaptation of a Universal Background Model,
    wherein the speaker model is a speaker adapted Hidden Markov Model,
        wherein the speaker model uses Bayesian inference to link observed parameters and hidden parameters,
        wherein the observed parameters are the feature vectors $x_{nmt}$ of utterance m of speaker n and time index t, and
        wherein the hidden parameters are at least one of a group of:
            the speaker factor $y_n$ for each speaker n,
            the channel factors $u_{nm}$ of the utterance m of speaker n,
            the active state $s_{nmt}$ generating the feature vector $x_{nmt}$, and
            the active component $z_{nmt}$ generating the feature vector $x_{nmt}$.

2. The method for text-dependent Speaker Recognition according to claim 1, wherein the Universal Background Model is unsupervised adapted based on enrolment utterances of the speaker.

3. The method for text-dependent Speaker Recognition according to claim 1, wherein only mean vectors and transition probabilities are adapted in the speaker model or wherein all parameters are adapted in the speaker model.

4. The method for text-dependent Speaker Recognition according to claim 1, wherein the Universal Background Model of the text-dependent system is trained in an unsupervised training before it is adapted.

5. The method for text-dependent Speaker Recognition according to claim 1, wherein utterances of a plurality of speakers, which may speak more than 5 different languages are used for an unsupervised training of the Universal Background Model of the text dependent system.

6. The method for text-dependent Speaker Recognition according to claim 1, wherein the topology of the Universal Background Model of the text-dependent system is selected to comprise a transition possibility from each possible state to itself and each possible other state.

7. The method for text-dependent Speaker Recognition according to claim 1, wherein the number of states is set to a number estimated by an analysis of the spectral properties of a signal.

8. The method for text-dependent Speaker Recognition according to claim 1, further comprising adapting one or more parameters to a lexical content.

9. The method for text-dependent Speaker Recognition according to claim 1, wherein the eigenvoices matrix and eigenchannel matrix are trained from the generic Universal Background Model in a development session.

10. The method for text-dependent Speaker Recognition according to claim 1, further comprising the step of verifying in an unsupervised way whether a test signal was spoken by a target person.

11. The method for text-dependent Speaker Recognition according to claim 1, wherein the speaker adapted model is used only to determine the most likely path, but not to compute the statistics, which are useable to extract the log likelihood ratios, wherein the channel may be compensated.

12. The method for text-dependent Speaker Recognition according to claim 1, wherein verifying whether the test signal was spoken by the targeted person comprises calculating the difference between
    the two terms of the log likelihood of the testing audio and the speaker model and the log product of the transition probabilities of the most likely path obtained with the speaker model
    and
    the log likelihood of the testing audio and the generic Universal Background Model and the log product of the transition probabilities of the most likely path obtained with the generic Universal Background Model.

13. The method for text-dependent Speaker Recognition according to claim 1, wherein the method further comprises identifying a target person by identifying the speaker adapted model with the highest likelihood score.

14. The method for text-dependent Speaker Recognition according to claim 1, wherein the Universal Background Model is a Hidden Markov Model.

15. The method for text-dependent Speaker Recognition according to claim 1, wherein the mean vectors and the transition probabilities of the Universal Background Model are adapted for the speaker model using a Maximum A Posteriori adaptation.

16. The method for text-dependent Speaker Recognition according to claim 1, wherein the channel factors are compensated in the speaker adapted model.

17. The method for text-dependent Speaker Recognition according to claim 1, wherein the following variables are used in the complete model:
    a sequence of speaker factors Y
    a sequence of channel factors U
    a sequence of the feature vectors X
    a sequence of Hidden Markov Model states S
    a sequence of Gaussian components Z.

18. The method for text-dependent Speaker Recognition according to claim 1, wherein the dependencies of the variables are described by a Bayesian network.

19. The method for text-dependent Speaker Recognition according to claim 1, wherein an iterative Expectation Maximization algorithm is applied for the training of the Universal Background Model given the development data.

20. The method for text-dependent Speaker Recognition according to claim 19, wherein in the iterative algorithm in some of the iterations an additional step is introduced for maintaining boundary conditions or a step is replaced by a step for maintaining boundary conditions.

21. The method for text-dependent Speaker Recognition according to claim 1, wherein a speaker dependent Hidden Markov Model is created by adapting the mean vectors and the eigenvoice matrix of the Universal Background Model according to the enrollment data.

22. The method for text-dependent Speaker Recognition according to claim 1, wherein for the training of the Universal Background Model the model is initialized with values found by training a full covariance Universal Background Model.

23. The method for text-dependent Speaker Recognition according to claim 1, wherein the method is used for speaker verification.

24. A method for text-dependent Speaker Recognition using a text-dependent and a text-independent system, wherein a model for the text-dependent system is adapted in an unsupervised way, and wherein, in addition, a model for the text-independent system for the speaker and the phrase is built,
wherein the model uses Bayesian inference to link observed parameters and hidden parameters,
wherein the observed parameters are the feature vectors $x_{nmt}$ of utterance m of speaker n and time index t, and
wherein the hidden parameters are at least one of a group of:
the speaker factor $y_n$ for each speaker n,
the channel factors $u_{nm}$ of the utterance m of speaker n,
the active state $s_{nmt}$ generating the feature vector $x_{nmt}$, and
the active component $z_{nmt}$ generating the feature vector $x_{nmt}$.

25. The method for text-dependent Speaker Recognition according to claim 24, wherein text-dependent speaker recognition according to claim 1 is used.

26. The method for text-dependent Speaker Recognition according to claim 24, further comprising the step of verifying in an unsupervised way whether a test signal was spoken by the target person.

27. The method for text-dependent Speaker Recognition according to claim 24, wherein the method further comprises a step of identifying a target person by identifying the speaker adapted model with the highest likelihood score.

28. The method for text-dependent Speaker Recognition according to claim 24, wherein the scalar weights for the linear combination have been trained in a development session.

29. A non-transitory computer readable medium comprising computer readable instructions for executing a method according to claim 1.

30. A system comprising means for executing a method according to claim 1.

31. The method of claim 1, further comprising channel correction.

32. The method of claim 2, wherein statistics are extracted using enrolment feature vectors, the Universal Background Model and a suitable algorithm.

33. The method of claim 32, wherein the suitable algorithm includes one of a forward-backward algorithm or a Viterbi algorithm.

34. The method of claim 8, wherein the one or more parameters includes at least one of the number of states or the Universal Background Model of the text dependent system.

35. The method of claim 8, wherein the lexical content is a passphrase.

36. The method of claim 26, wherein verifying whether the test signal was spoken by the target person comprises comparing a linear combination of the log likelihood ratios of the text-dependent system and the log likelihood ratio of the text-independent system with a threshold.

37. The method of claim 1, wherein $x_{nmt}$ depends on $y_n$, $u_{nm}$, $s_{nmt}$ and $z_{nmt}$, $z_{nmt}$ depends on $s_{nmt}$ and $s_{nmt}$ depends on $s_{nmt-1}$.

38. The method for text-dependent Speaker Recognition according to claim 1, wherein the observation probability distributions of the Universal Background Model of the text-dependent system are Gaussian Mixture Models.

39. The method for text-dependent Speaker Recognition according to claim 38, wherein the observation probability distributions of the Universal Background Model of the text-dependent system are Gaussian Mixture Models with diagonal covariance matrices and four components.

40. The method for text-dependent Speaker Recognition according to claim 1, wherein the number of states of the Universal Background Model of the text-dependent system is fixed.

41. The method for text-dependent Speaker Recognition according to claim 20, wherein the additional step is a step of divergence re-estimation.

42. The method for text-dependent Speaker Recognition according to claim 22, wherein, after the model is initialized, the eigenvoice matrix is initialized and the eigenchannel matrix is assumed as 0.

43. The method for text-dependent Speaker Recognition according to claim 42, wherein, after the model is initialized, the eigenvoice matrix is initialized and the eigenchannel matrix is assumed as 0, then a suitable algorithm is applied neglecting any channel factors, wherein the values thus found are used to initialize the eigenchannel matrix.

44. The method for text-dependent Speaker Recognition according to claim 1, wherein the method is used for speaker identification.

45. The method for text-dependent Speaker Recognition using a text-dependent and a text-independent system, according to claim 24, wherein the model for the text-dependent system is a Hidden Markov Model.

46. The method for text-dependent Speaker Recognition using a text-dependent and a text-independent system, according to claim 24, wherein the model for the text-dependent system is adapted by MAP.

47. The method for text-dependent Speaker Recognition using a text-dependent and a text-independent system, according to claim 24, wherein the model for the text-dependent system is adapted by a Bayesian algorithm.

* * * * *